(12) United States Patent
Yablon et al.

(10) Patent No.: US 8,869,959 B2
(45) Date of Patent: Oct. 28, 2014

(54) VEHICLE SUSPENSION DAMPER

(75) Inventors: Joshua Benjamin Yablon, Santa Clara, CA (US); Dennis K. Wootten, Scotts Valley, CA (US); Robert C. Fox, Los Gatos, CA (US); David M. Haugen, Pacific Grove, CA (US); Sante Pelot, Aptos, CA (US)

(73) Assignee: Fox Factory, Incorporated, Watsonville, CA (US)

( * ) Notice: Subject to any disclaimer, the term of this patent is extended or adjusted under 35 U.S.C. 154(b) by 1119 days.

(21) Appl. No.: 12/509,258

(22) Filed: Jul. 24, 2009

(65) Prior Publication Data

US 2010/0044975 A1 Feb. 25, 2010

Related U.S. Application Data

(63) Continuation-in-part of application No. 12/407,610, filed on Mar. 19, 2009.

(60) Provisional application No. 61/083,478, filed on Jul. 24, 2008, provisional application No. 61/157,541, filed on Mar. 4, 2009, provisional application No. 61/227,775, filed on Jul. 22, 2009.

(51) Int. Cl.
| | |
|---|---|
| *B60T 7/12* | (2006.01) |
| *B62K 25/08* | (2006.01) |
| *B60G 11/27* | (2006.01) |
| *B60G 17/04* | (2006.01) |
| *B60G 17/052* | (2006.01) |
| *F16F 9/46* | (2006.01) |
| *F16F 9/512* | (2006.01) |
| *F16F 9/06* | (2006.01) |

(52) U.S. Cl.
CPC ............... *F16F 9/512* (2013.01); *B62K 25/08* (2013.01); *B60G 2300/12* (2013.01); *B60G 11/27* (2013.01); *B60G 2202/152* (2013.01); *B60G 17/0416* (2013.01); *B60G 17/052* (2013.01); *B60G 2500/22* (2013.01); *F16F 9/466* (2013.01); *F16F 9/065* (2013.01)
USPC ........................................................ 188/319.1

(58) Field of Classification Search
USPC ............ 267/64.25–64.28; 188/319, 313, 316, 188/317, 319.1, 319.2
See application file for complete search history.

(56) References Cited

U.S. PATENT DOCUMENTS

| | | | |
|---|---|---|---|
| 3,525,512 A | 8/1970 | Hagwood | |
| 4,303,231 A | * 12/1981 | Reuschenbach et al. | .. 267/64.15 |

(Continued)

FOREIGN PATENT DOCUMENTS

| | | |
|---|---|---|
| EP | 0855533 | 7/1998 |
| EP | 1655158 | 5/2006 |
| GB | 942328 | 11/1963 |
| GB | 1099734 A | 1/1968 |

OTHER PUBLICATIONS

European Search Report for European Application No. 09166412, 7 pages, Nov. 4, 2009.

*Primary Examiner* — Vishal Sahni

(57) ABSTRACT

A vehicle suspension damper for providing a variable damping rate. The vehicle suspension damper comprises a first damping mechanism having a variable first threshold pressure, a second damping mechanism having a second threshold pressure, and a compressible chamber in communication with a damping fluid chamber, wherein the second damping mechanism is responsive to a compression of said compressible chamber.

15 Claims, 29 Drawing Sheets

(56) References Cited

U.S. PATENT DOCUMENTS

| | | | |
|---|---|---|---|
| 4,453,638 A * | 6/1984 | Wallace | 188/282.9 |
| 4,915,364 A * | 4/1990 | Perlini | 267/64.26 |
| 5,027,637 A * | 7/1991 | Umetsu | 72/453.13 |
| 5,293,968 A | 3/1994 | Schuelke et al. | |
| 6,322,058 B1 * | 11/2001 | Tanigawa et al. | 267/64.15 |
| 6,360,857 B1 * | 3/2002 | Fox et al. | 188/281 |
| 6,491,146 B1 * | 12/2002 | Yi et al. | 188/319.2 |
| 6,695,105 B2 * | 2/2004 | Toiyama | 188/298 |
| 6,782,980 B2 | 8/2004 | Nakadate | |
| 6,915,885 B2 | 7/2005 | Förster | |
| 6,938,887 B2 * | 9/2005 | Achenbach | 267/64.22 |
| 8,464,850 B2 | 6/2013 | Fox | |
| 2002/0121416 A1 | 9/2002 | Katayama et al. | |
| 2002/0175035 A1 | 11/2002 | Achenbach | |
| 2003/0029684 A1 | 2/2003 | Forster | |
| 2003/0047398 A1 | 3/2003 | Toiyama | |
| 2003/0132073 A1 | 7/2003 | Nakadate | |
| 2008/0116622 A1 * | 5/2008 | Fox | 267/64.28 |

* cited by examiner

VEHICLE SUSPENSION DAMPER

CROSS-REFERENCE TO RELATED APPLICATIONS

This present patent application is a continuation-in-part of each co-pending U.S. Patent Provisional Application No. 61/083,478 filed Jul. 24, 2008, U.S. Patent Provisional Application No. 61/157,541 filed Mar. 4, 2009, U.S. patent application Ser. No. 12/407,610 filed Mar. 19, 2009, and U.S. Patent Provisional Application No. 61/227,775 filed Jul. 22, 2009, each of which are incorporated herein, in its entirety, by reference.

All references cited in the specification, and their references, are incorporated by reference herein in their entirety where appropriate for teachings of additional or alternative details, features and/or technical background.

US GOVERNMENT RIGHTS

Not applicable.

FIELD

Embodiments of the present technology relate generally to the field of vehicle suspension.

BACKGROUND

Vehicles, including wheeled vehicles, are typically suspended to absorb shock encountered while traversing uneven terrain. Wheeled vehicles usually include one suspension assembly per wheel so that each wheel may absorb shock independently. In many cases each such suspension assembly comprises both a spring portion and a damping portion. The spring portion may consist of a mechanical spring, such as a wound helical spring, or it may comprise a pressurized volume of gas. Gas is often used because it is light weight. Unlike typical simple mechanical springs, gas springs have non-linear spring rates. Compound mechanical springs may also have non-linear rates. A single gas spring has a spring rate that becomes highly exponential at compression ratios greater than about sixty percent. As a practical matter that can mean that a shock absorber including a gas spring can becomes very stiff just past the middle of its compressive stroke. Such excess stiffness over an extended length of the stroke is often undesirable (e.g. harsh riding vehicle).

In performing the dampening function, the damping mechanism of a shock absorber also creates resistance of the shock absorber to movement (e.g. compression and/or rebound). Unlike the spring which resists based on compressive displacement, fluid dampers usually have resistance to movement that varies with displacement rate (i.e. velocity). That may be disadvantageous because low velocity (i.e. low frequency) high amplitude shocks may compress the spring while the damper offers little resistance. In such cases the shock absorber may compress beyond a desired point because the damper did not contribute to shock compression resistance.

What is needed is a shock absorber dampener that offers resistance to movement as a function of axial displacement. What is needed is a suspension dampener that is relatively compliant at low axial displacement and progressively more resistant to movement at higher displacements. What is needed is a suspension (e.g. shock absorber, fork) having a gas spring with good low displacement resistance and more compliance at greater compression ratios. What is needed is a shock absorber having a gas spring and a dampener that can be tuned together to yield optimized shock absorber force/travel/velocity characteristics.

BRIEF DESCRIPTION OF DRAWINGS

The accompanying drawings, which are incorporated in and form a part of this specification, illustrate embodiments of the present technology for an axle for removably retaining a wheel on a vehicle, and, together with the description, serve to explain principles discussed below.

DESCRIPTION OF EMBODIMENTS

Figure 1:
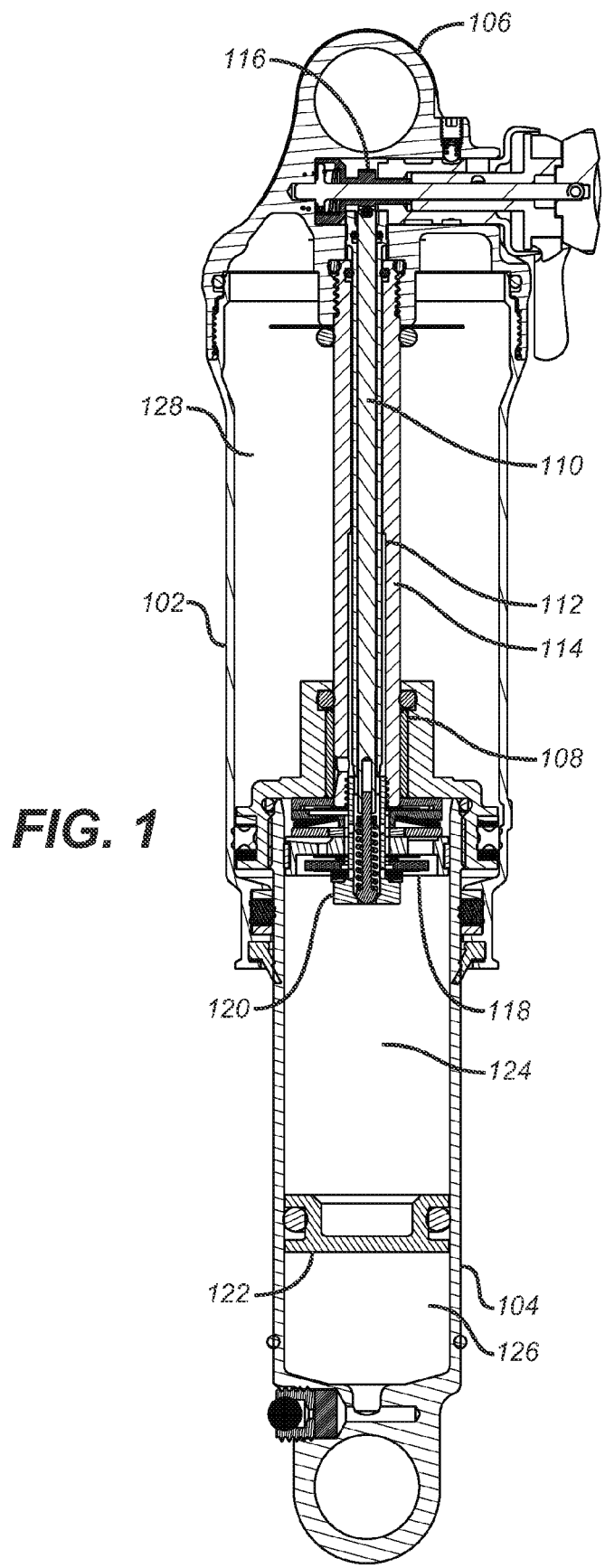
FIG. 1 is a cross-sectional view of a bicycle shock absorber embodiment as disclosed herein.

One embodiment hereof comprises a gas spring shock absorber for a vehicle. In one embodiment the vehicle is a bicycle. The shock absorber is advantageous because it includes a damper having a manually adjustable damping resistance and a position and/or pressure sensitive variable damping resistance. The manually adjustable damping function allows a user to adjust a "platform" threshold which must be exceeded before the shock absorber can experience significant compression travel. It allows the user to establish a level, in one embodiment, for compression damping whereby such damping is increased or decreased selectively. A bicycle rider for example may choose to set a fairly high threshold for the function of compression damping (by adjusting and increasing the seating force of damping adjustment valve 204 in aperture 206, for example, as discussed below) thereby reducing pedal induced suspension bob. In one embodiment the manual adjustment and the position sensitive variability of the damping are independent. In one embodiment both chambers of a dual gas chamber gas spring can be filled simply in one pressurization step. In one embodiment a gas chamber shock can further include an internal floating piston and at least a second gas chamber exerting a base operating pressure on the damping fluid. In one embodiment the suspension is a bicycle or motorcycle fork. Optionally damping fluid can be isolated from the gas spring.

U.S. Pat. No. 6,135,434, which patent is herein incorporated by reference in its entirety, shows certain variations of positive and negative spring mechanisms. Another selectively variable damping mechanism is shown in U.S. Pat. No. 6,360,857 which patent is herein incorporated by reference in its entirety. Other selectively variable damping mechanisms are shown in U.S. patent application Ser. Nos. 11/567,074 and 11/617,713 each of which is herein incorporated by reference in its entirety. Optionally, any of the foregoing mechanisms may be integrated, or used in combination, with any other features disclosed herein.

U.S. Pat. Nos. 6,415,895, 6,296,092, 6,978,872 and 7,308,976, each of which patents is herein incorporated by reference in its entirety, show certain variations of position sensitive damping mechanisms. Another position sensitive damping mechanism is shown in U.S. Pat. No. 7,374,028 which patent is herein incorporated by reference in its entirety. Another position sensitive damping mechanism is shown in U.S. Pat. No. 5,190,126 which patent is herein incorporated by reference in its entirety. Optionally, any of the foregoing mechanisms may be integrated, or used in combination, with any other features disclosed herein.

U.S. Pat. Nos. 6,581,948, 7,273,137, 7,261,194, 7,128,192, and 6,604,751, each of which patents is herein incorporated by reference in its entirety, show certain variations of inertia valve mechanisms for controlling aspects of compression damping. Additionally, U.S. Published Patent Application Nos. 2008/0053768 A1, 2008/0053767 A1, 2008/0035439 A1, 2008/0007017 A1, 2007/0296163 A1, 2007/0262555 A1, 2007/0228691 A1, 2007/0228690 A1, 2007/0227845 A1, 2007/0227844 A1, 2007/0158927 A1, 2007/0119670 A1, 2007/0068751 A1, 2007/0012531 A1, 2006/0065496 A1, each of which patent applications is herein incorporated by reference in its entirety, show certain variations of inertia valve mechanisms for controlling aspects of compression damping. Optionally, any of the foregoing inertia valve mechanisms or other features may be integrated, or used in combination, with any other features disclosed herein. A shock absorber or fork may be equipped, for example, with an inertia valve for controlling an aspect of damping and a position sensitive valve for controlling another aspect of damping.

FIG. 1 shows an embodiment of a bicycle shock absorber. The shock absorber includes a body 104 slidably (axially) disposed in a sleeve assembly 102. The sleeve assembly 102 is connected, by helical threads, to an eyelet assembly 106. Eyelet assembly 106 is explained in more detail in FIG. 10 below. A bearing assembly 108 is connected to an end of the body 104 by threads and is fluid sealed in relation thereto. Inner compression rod 110 is disposed approximately concentrically within rebound metering rod 112. Those rods 110 and 112 are disposed approximately concentrically within shaft 114. Shaft 114 is threaded at a first end in sealing engagement into eyelet (or top cap) 116. Piston assembly 118 is threaded into a second end of shaft 114 by means of piston bolt 120. Floating piston assembly 122 (e.g. "movable barrier") is disposed within and axially movable in relation to body 104. The floating piston assembly 122 divides an interior of body 104 into a damping fluid chamber 124 and a compressible chamber 126. The assembly of FIG. 1A also forms a spring chamber 128.

In operation an axial compressive force exerted on the shock absorber causes the body 104 and attached bearing assembly 108 to move axially further into an interior of the sleeve assembly 102. In so moving, the body 104 and bearing assembly 108 also move axially relative to the piston assembly 118, the shaft 114, rods 110 and 112, and the eyelet assembly 106. During that movement, gas in the spring chamber 128 is compressed thereby storing energy for release during rebound. Damping occurs as damping fluid in damping fluid chamber 124 is forced to move from a first side 406 (see FIG. 4A) of piston assembly 118 to a second side 408 (see FIG. 4A) of piston assembly 118 through flow paths, typically through the piston assembly 118, having varying degrees of designed resistance to flow through. The design of a valve piston assembly, for example, the valve piston assembly 300 of FIG. 3, where such valve piston assembly 300 is an embodiment of a suitable piston assembly 118, determines the operational fluid flow paths in the piston assembly 118 through which the damping fluid may flow and thereby dictates the degree of damping available. Referring to the embodiment of FIG. 3, the valve piston assembly 300 is configured so that certain fluid flow paths are open for compression damping and certain other flow paths are open for rebound damping. That allows for differing degrees of damping during shock compression versus shock rebound.

As the body 104 moves further into sleeve assembly 102 during compression, shaft 114 enters the volume of damping fluid chamber 124 and reduces available fluid volume therein. In one embodiment, compressible chamber 126 is filled with a compressible fluid such as a gas. The compressible chamber 126 in one embodiment comprises a gas. In another embodiment, the compressible chamber 126 is preloaded at an elevated pressure. Damping fluid chamber 124 is typically filled with a liquid damping fluid that is relatively incompressible. As the shaft 114 enters damping fluid chamber 124 and reduces fluid volume therein, the relatively incompressible damping fluid is displaced. The volume of damping fluid chamber 124 is therefore correspondingly increased to compensate for the reduction, due to the incursion of shaft 114, by movement of floating piston assembly 122 such that the gas in chamber 126 is compressed or further compressed. As described herein, floating piston assembly 122 separates compressible chamber 126 and damping fluid chamber 124. The floating piston assembly 122 is configured for transferring pressure from the damping fluid chamber 124 to the compressible chamber 126. The floating piston assembly 122 moves to reduce the volume of compressible chamber 126 (and compressing the fluid therein) while increasing (i.e. compensating) the volume of damping fluid chamber 124.

Figure 2:
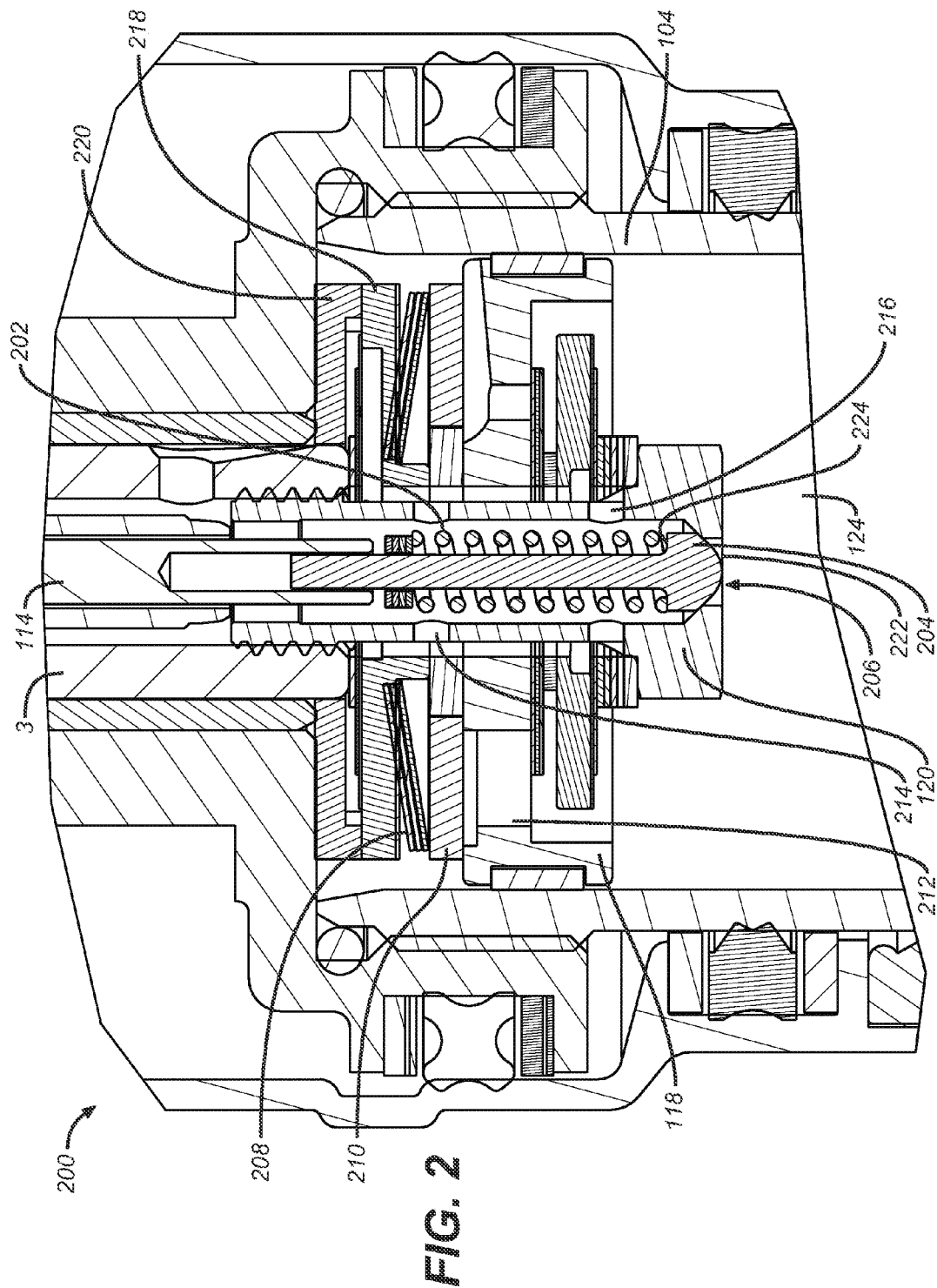
FIG. 2 is a cross-sectional view of a valve piston embodiment as disclosed herein.

In one embodiment both compression and rebound damping are selectively adjustable by the user. FIG. 2 shows a detail of an embodiment of a valve piston assembly 200 where such valve piston assembly 200 is an embodiment of a suitable piston assembly 118. Referring to FIGS. 1 and 2, it is shown that shaft 114 axially abuts damping adjustment spring 202 which in turn abuts a shoulder on damping adjustment valve 204. Damping adjustment valve 204 is biased by damping adjustment spring 202 to obstruct fluid flow through aperture 206 (in piston bolt 120). As will be discussed, shaft 114 is axially and selectively movable toward and away from aperture 206 which in turn increases and decreases respectively a seating force of damping adjustment valve 204 in aperture 206. During compression, damping fluid in damping fluid chamber 124 must overcome the seating force of damping adjustment valve 204 in aperture 206 in order to flow 420 through aperture 206 and ultimately to the second side 408 (of FIG. 4A) of piston assembly 118. The seating force thereby dictates a first aspect of the compression damping threshold. In one embodiment, a seating force of the damping adjustment valve 204 may be externally adjusted by means of the knob 1010 (of FIG. 10) and corresponding camshaft 1008 (of FIG. 10) with the eyelet cap 106. Rotation of the knob 1010 rotates the camshaft moving shaft 114 axially and correspondingly adjusting the closure force (i.e. damping force) of damping adjustment valve 204 in aperture 206.

For example, and referring to FIGS. 2 and 4, in one embodiment, as shaft 114 moves towards compressible chamber 124, and inner compression rod 110 pushes damping adjustment spring 202, damping adjustment spring 202 is pushed towards the damping adjustment valve 204. As the piston assembly 118, including the damping adjustment valve 204 (i.e. the shock absorber) is compressed, pressure within damping fluid chamber 124 increases. This increased pressure pushes against the damping adjustment valve 204. If the pressure overcomes a seating force of damping adjustment valve 204, then aperture 206 opens up and allows damping fluid to flow through. The damping fluid flows through flow channels 214 and 216 (of FIG. 2) to the second side 408 of piston assembly 118.

A second aspect of compression damping is dictated by the compressive preload of Bellville springs 208 against shuttle 210. Shuttle 210 normally blocks flow channel(s) 212, thereby preventing fluid flow from a first side 406 to a second side 408 of piston assembly 118. Bellville springs 208 maintain the shuttle 210 in the blocking position until fluid pressure in damping fluid chamber 124 (below the piston assembly 118) exerts a pressure over the area of the flow channel 212 that is greater than the Bellville Springs 208 preload.

In one embodiment the aforementioned two aspects of controlling compression damping are independent and their respective functions controlled by available respective flow channel 212 and aperture 206 in relation to the preload on their respective springs, Bellville Spring 208 and damping adjustment spring 202, respectively. In one embodiment the ratio of the area of aperture 212 over the preload on damping adjustment spring 202 is greater than that same ratio taken for area of flow channel 212 over the preload on Bellville springs 208. That means that the same pressure in damping fluid chamber 124 will open the aperture 206 before it will open flow channel 212. Because of that, in use on a shock absorber equipped bicycle (shock of the embodiment described herein), increased preloads on damping adjustment spring 202 will decrease "pedal bob", the amplitude of which will not typically create a compression velocity (between the body 104 and the sleeve 102) sufficient to elevate pressure in damping fluid chamber 124 to open flow channel 212. The flow area of aperture 206 is limited however, so if greater mass flow is required across piston assembly 118 then ultimately aperture 206 will flow choke (e.g. critical flow) and pressure will begin to increase in damping fluid chamber 124. If a large obstruction is encountered the greater mass flow rate of damping fluid required to be moved through the piston assembly 118 will (due to amplitude of obstruction and corresponding amplitude of the compression velocity required to accommodate that amplitude which velocity is exhibited as increased pressure in damping fluid chamber 124) will cause the Bellville springs 208 to deflect and thereby allow flow channel 212 to open.

Figure 3:
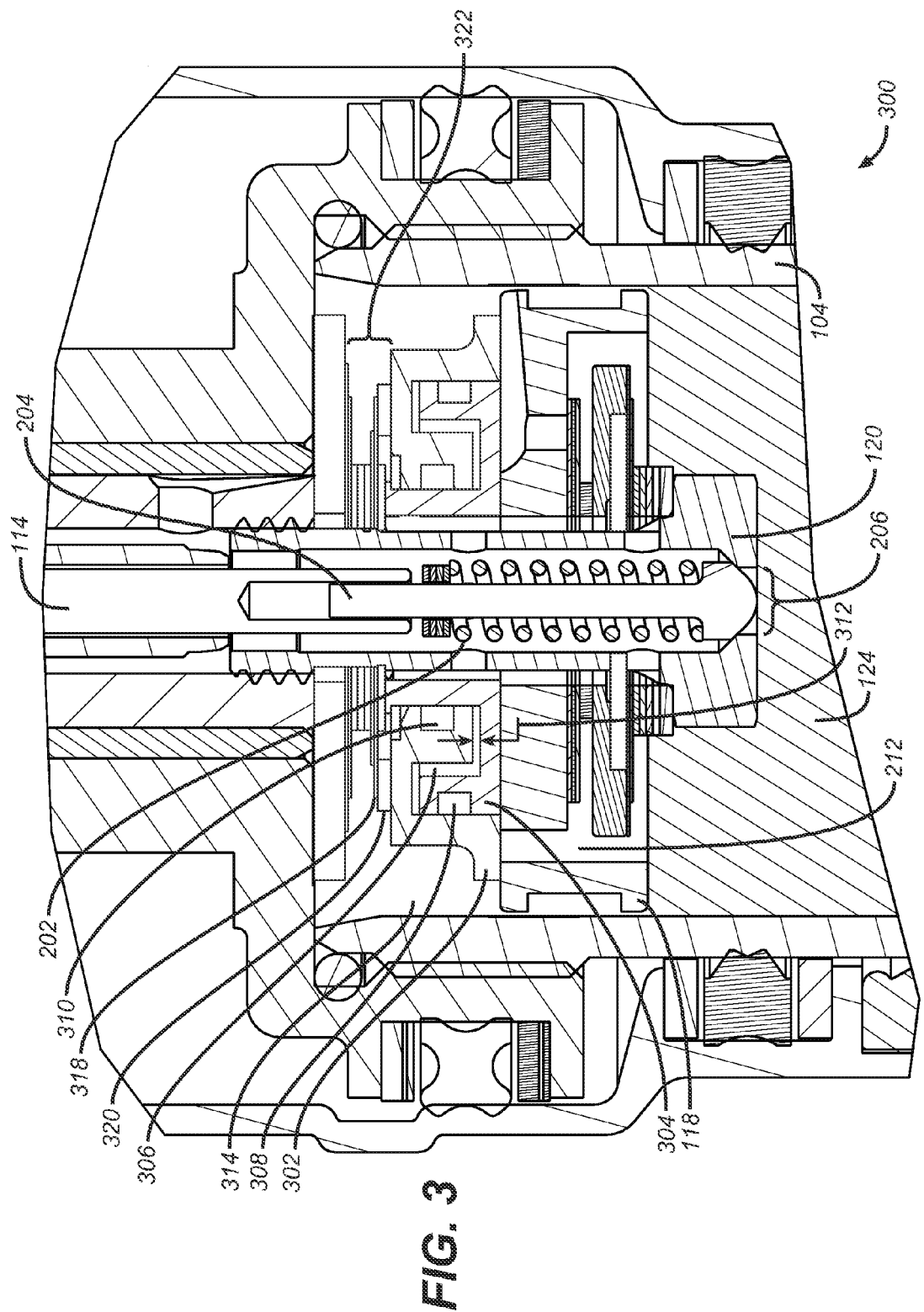
FIG. 3 is a cross-sectional view of a valve piston embodiment as disclosed herein.

In one embodiment both of the foregoing damping functions are intrinsic in the design of the valve piston assembly 200. FIG. 3 shows a detail of the valve piston assembly 300. In that embodiment the first aspect of damping involving aperture 206 and damping adjustment spring 202 is as previously described herein. The valve piston assembly 300 of FIG. 3 includes another, or "position sensitive" aspect of compression damping that operates somewhat differently than (referring to FIG. 2) the previously described "second aspect of compression damping." Of note, the Bellville spring 208 may be used in conjunction with the movable valve outer 302, to be described in FIG. 3, in order to augment closure force of the FIG. 3 configuration. FIG. 3 shows piston assembly 118 having compression damping flow channel(s) 212 there through. A movable valve outer 302 selectively obstructs flow channel 212. The movable valve outer 302 is "nested" approximately concentrically with valve inner 304. A fillable chamber 306 is formed by the engaged movable valve outer 302 and valve inner 304. Optionally the fillable chamber 306 contains gas at atmospheric pressure. Additionally, valve shims 318 and spacers 320 may stack out to hold valve inner 304 in contact with piston assembly 118.

Because of the axially movable floating piston assembly 122, the damping fluid pressure in damping fluid chamber 124 is maintained at a pressure substantially equal to the compressible fluid pressure in compressible chamber 126 (or vice versa). Because, during compression, the fluid volume of damping fluid chamber 124 is reduced by intrusion of shaft 114 into chamber 124 and the fluid in compressible chamber 126 is correspondingly compressed, the pressure of the damping fluid in damping fluid chamber 124 increases during a compression stroke of the shock absorber as a function of the axial displacement of the shock absorber. Optionally, the initial (e.g. uncompressed—extended shock) pressure charge in compressible chamber 126 may be elevated above atmospheric (e.g. 400 psi) and the extended damping fluid pressure of damping fluid chamber 124 will be elevated correspondingly. The result of the foregoing, including the incursion of shaft 114 into damping fluid chamber 124 during compression, is that as the shock absorber strokes further in compression the "ambient" pressure of the damping fluid in damping fluid chamber 124 increases. That increase is largely independent of any dynamic pressure differential across the piston assembly 118 due to the velocity of compression. The shock absorber has an ambient damping fluid pressure that is therefore dependent on position in the compression stroke of the shock absorber.

In operation a fluid pressure differential, between the damping fluid chamber 124 and the fillable chamber 306, exerts a force, on the engaged part couple formed by the movable valve outer 302 and valve inner 304, over the annular area defined between the $1^{st}$ o-ring seal 308 and the $2^{nd}$ o-ring seal 310 of FIG. 3. In one embodiment, gas at atmospheric pressure is contained inside the fillable chamber 306 and damping fluid at an elevated static pressure is contained in damping fluid chamber 124. The differential pressure between the damping fluid and the fillable chamber 306 tends to drive the movable valve outer 302 and the valve inner 304 more tightly together axially in attempt to close gap(s) 312. Since the valve inner 304 is initially axially restrained against the piston assembly 118 from below and the spring and the shim 318 (or a spring/washer stack) from above, the differential pressure (visually—the closing of gap 312) causes the movable valve outer 302 to press more tightly against the opening of flow channel 212 which moves the valve inner 304 upward thereby compressing the spring washer stack 322. As gap 312 is closed, a greater compression of the spring washer stack 322 is realized thereby increasing the closure force of movable valve outer 302 on flow channel 212. In one embodiment the flow channel 212 may be opened when a fluid pressure below a piston (e.g. in region of fluid damping chamber 124 of FIG. 1) of the piston assembly 118 is elevated sufficiently (due to shock absorber compression and dynamic compression below the piston) to overcome the compressed spring washer stack 322 above the valve inner 304. In one embodiment, the fillable chamber 306 may be externally adjusted. In another embodiment, the fillable chamber 306 comprises a fluid. In yet another embodiment, the fillable chamber 306 comprises a gas. The gas may be at atmospheric pressure, in one embodiment. In yet another embodiment, the fillable chamber 306 comprises a gas at an elevated pressure, wherein the elevated pressure biases the variable damper towards an open position.

Figure 4A:
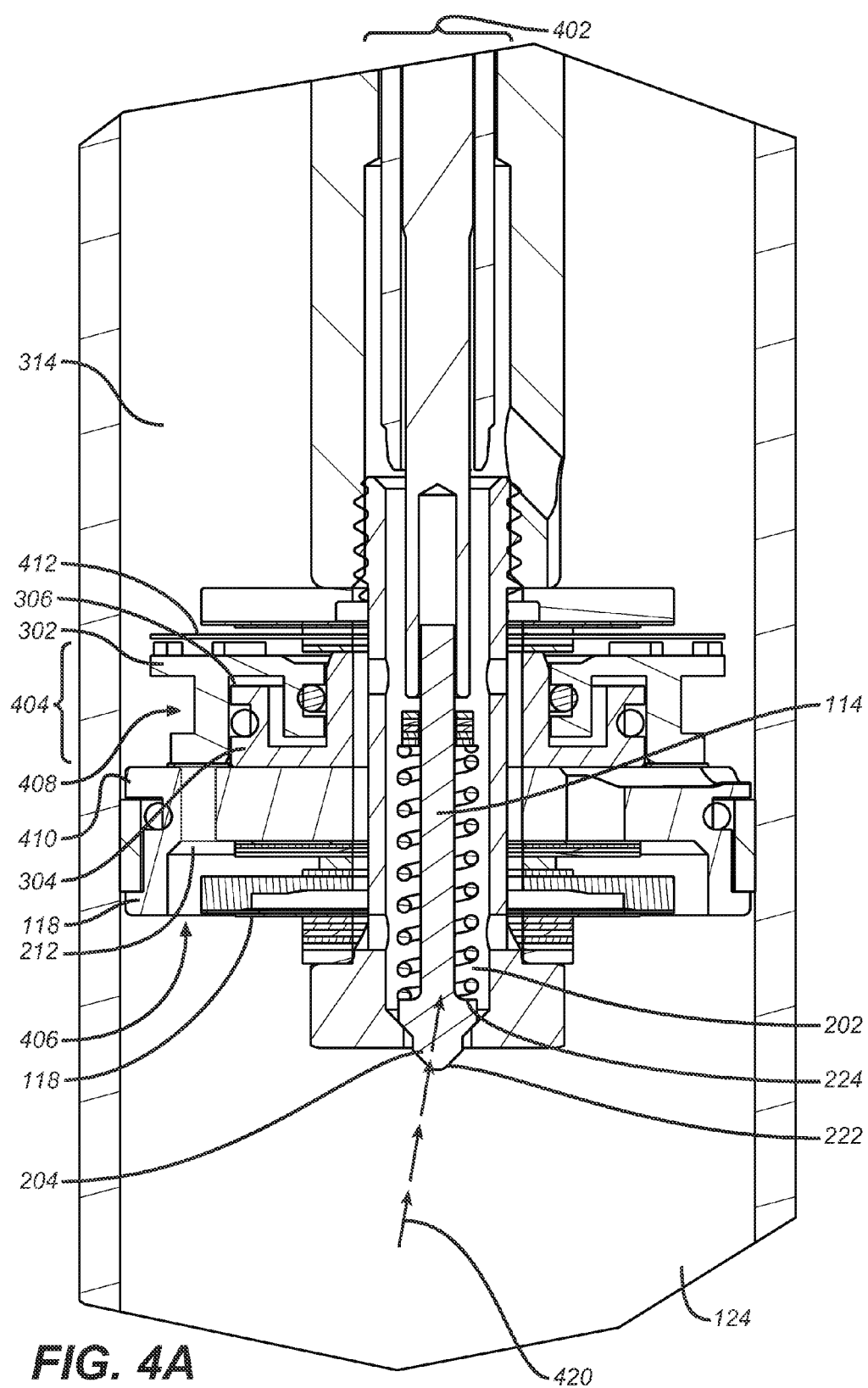
FIG. 4A-E are a cross-sectional view of a valve piston embodiment as disclosed herein.
Figure 4B:
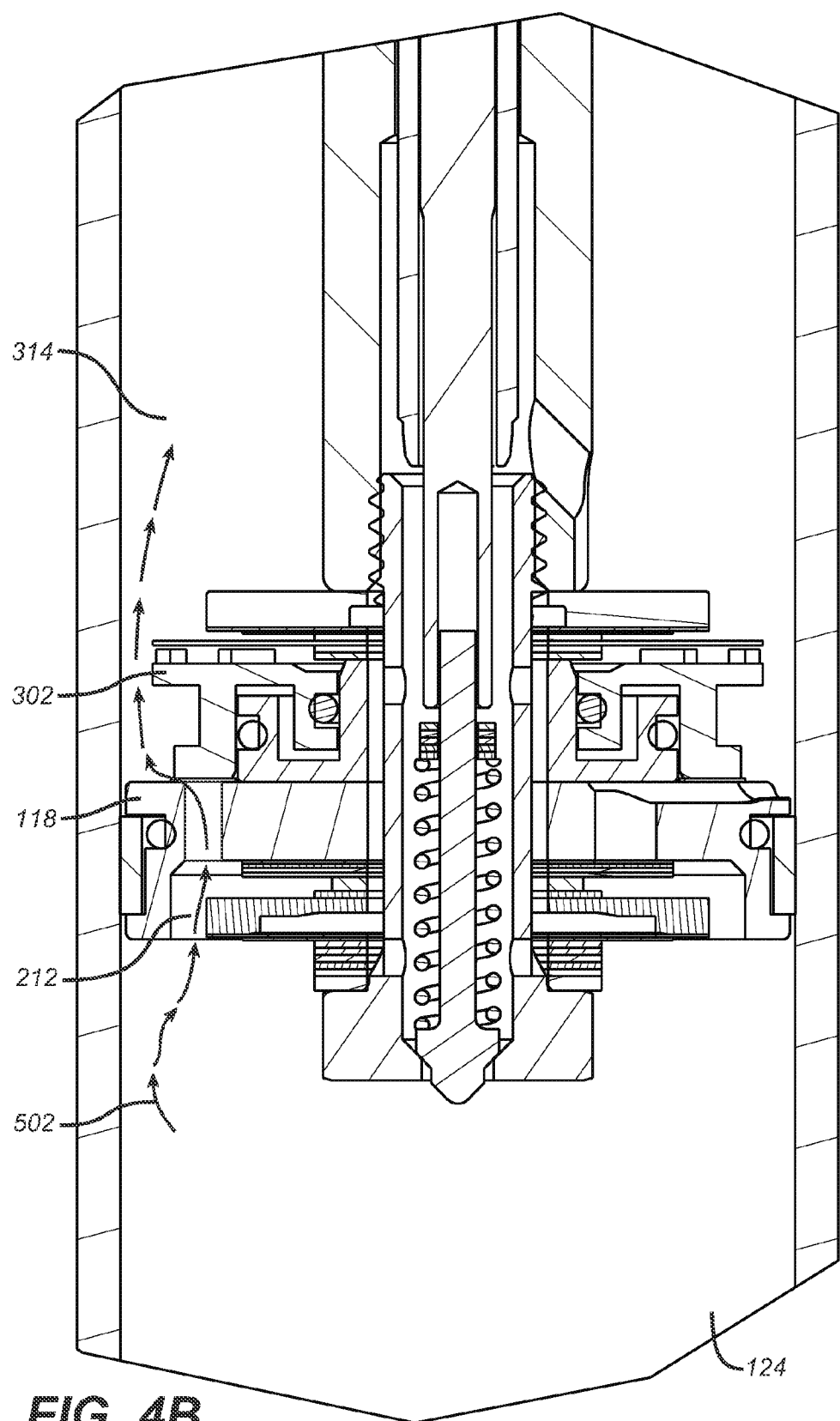

Referring to FIGS. 4A and 4B, embodiments of valve piston assembly 300 or "boost valve" of FIG. 3 is in the process of altering a damping rate of a vehicle suspension damper in accordance with the present technology is shown. FIG. 4A shows a first damping mechanism 402 comprising a first surface 222 and a second surface 224. The first surface 222 abuts the damping fluid chamber 124. The second surface 224 abuts a damping adjustment spring 202. FIG. 4A also comprises a second damping mechanism 404 that comprises a valve inner 304 and a movable valve outer 302 enclosing a fillable chamber 306. First side of piston assembly 118 is referenced as 406 and second side of piston assembly 118 is referenced as 408. Flow channel 212 runs between first side 406 and second side 408 of piston assembly 118. A first flow rate 420 of a fluid is shown as arrows flowing through the damping adjustment valve 204.

According to embodiments of the present technology, the damping adjustment spring 202 is configured for providing variable resistance to pressure from a damping fluid of the damping fluid chamber 124 on the damping adjustment valve 204 (shown in FIG. 2). The damping adjustment valve 204 is configured to open and allow fluid to flow between the damping fluid chamber 124 and a portion of the vehicle suspension damper that is sealed off from the damping fluid chamber 124 (e.g., enclosed fillable space 314 [or "a second portion of damping fluid chamber 124"]) when a variable first threshold pressure is overcome.

In one embodiment, the fillable space 314 comprises preloaded matter. In one embodiment, this preloaded matter may be a fluid. In another embodiment, this preloaded matter may be a gas.

In embodiments of the present technology, the variable damper comprises a valve inner 304 that is axially restrained against a piston of the piston assembly 118. In another embodiment, the variable damper comprises a movable valve outer 302 configured for selectively obstructing a flow channel 212 running between the damping fluid chamber 124 and the second side 408 of the piston assembly 118. The second side 408 of the piston assembly 118 partially borders an enclosed fillable space 314. The flow channel 212 is obstructed in response to a stage of the compression of the compressible chamber 126.

Referring still to FIG. 4A and during operation of embodiments of the present technology, during a compression stroke in accordance with the position sensitive aspect of compression damping, damping fluid flows 502 from a first side 406 of piston assembly 118 to a second side 408 of piston assembly 118 through flow channel 212. In doing so and now referring to FIG. 4B, the damping fluid exerts a force on the movable valve outer 302 tending to move movable valve outer 302 off of piston assembly 118 (and flow channel 212) and to increase gap 312. Of note, in order to reverse this force and cause the gap 312 to bias towards open, the damping fluid dynamic pressure differential from below the piston assembly 118 multiplied times the area of the flow channel(s) 212 must exceed the previously described force that tends to close gap 312.

Figure 4C:
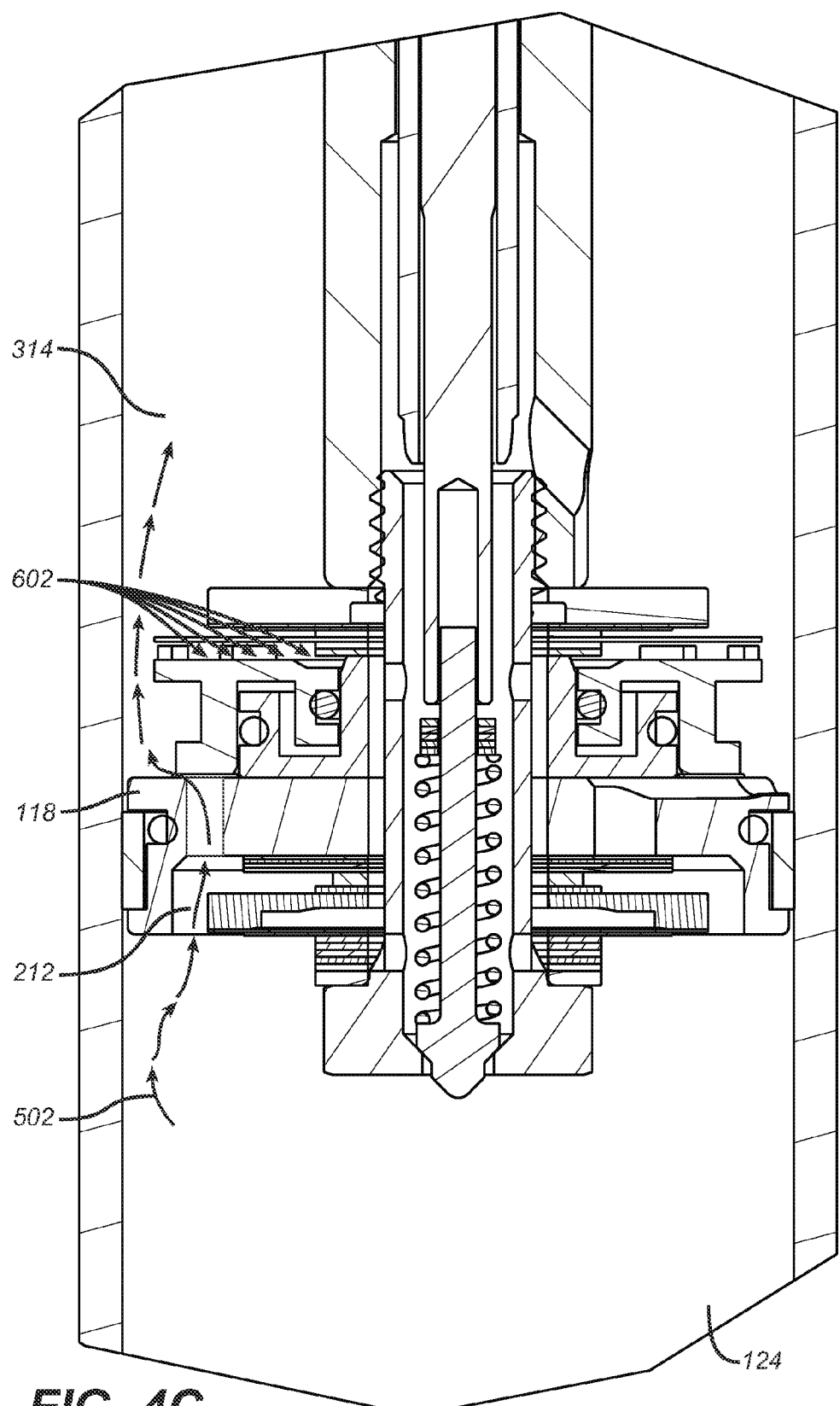

Referring now to FIG. 4C, an embodiment of a valve piston assembly 300 of FIG. 3 in the process of altering a damping rate of a vehicle suspension damper in accordance with the present technology is shown. As the shock absorber compression proceeds in its stroke, the ambient damping fluid pressure 602 in the fillable enclosed space 314 increases. This ambient damping fluid pressure 602 pushes against the second damping mechanism 404 in the direction of the piston assembly 118. By pushing against the second damping mechanism 404 in this direction, the gap 312 biases towards closed. Therefore, for the position sensitive aspect of damping to operate, the dynamic fluid pressure differential across piston assembly 118 increases as does the corresponding compression damping coefficient of the shock absorber.

Figure 4D:
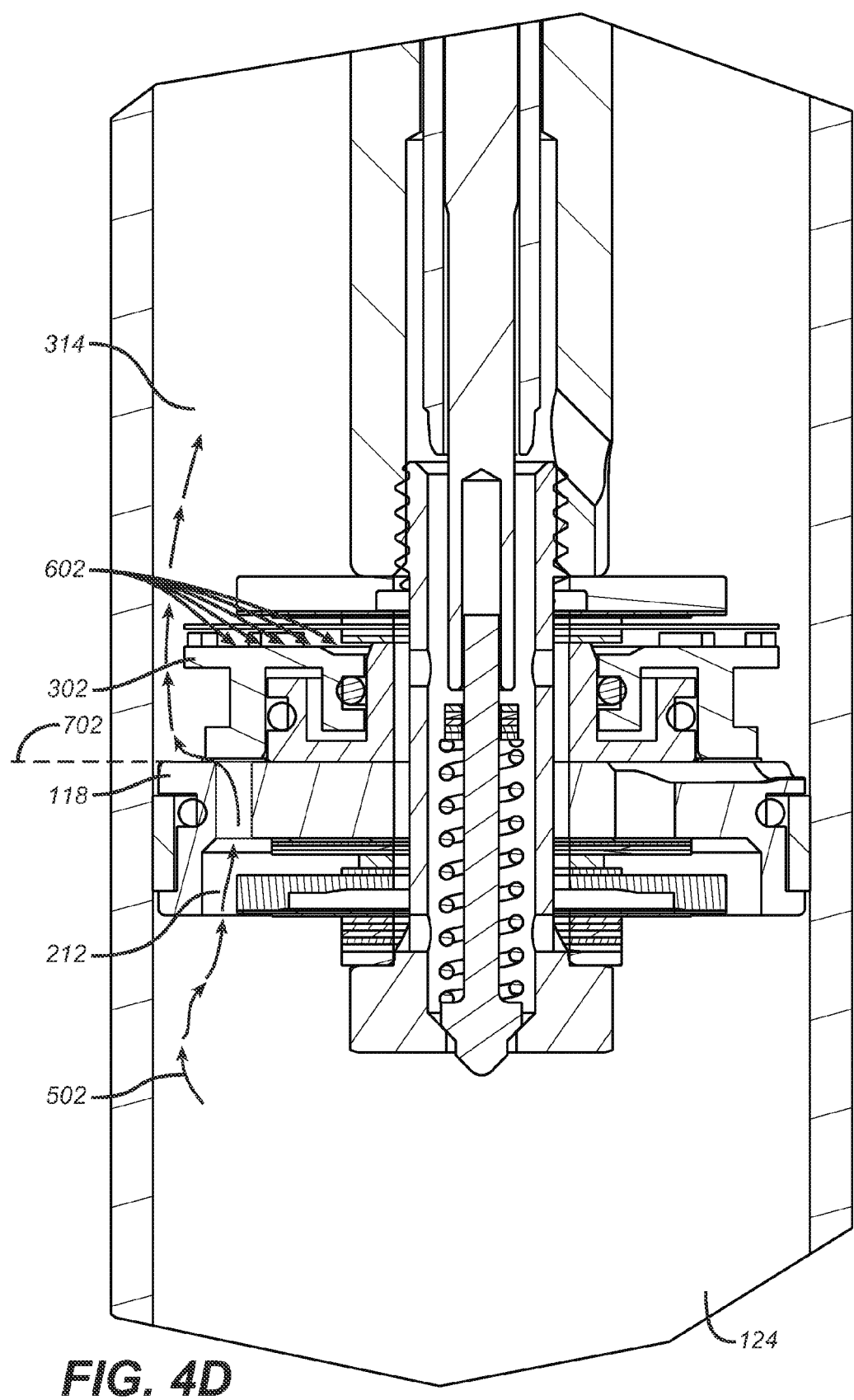

Referring now to FIG. 4D, an embodiment of a valve piston assembly 300 of FIG. 3 in the process of altering a damping rate of a vehicle suspension damper in accordance with the present technology is shown. For example, the threshold of the second damping mechanism 404 is increased by the increase of the ambient pressure 602 against the movable outer valve 302. The movable outer valve 302 is pushed against the piston assembly 118 and the flow channel 212, making it difficult for damping fluid to flow through flow channel 212 and into the enclosed fillable space 314. The amount of pressure needed to push this damping fluid through flow channel 212 and past the second damping mechanism 404 is increased, thereby having increased the threshold of the second damping mechanism 404.

In one embodiment, the first damping mechanism 402 and the second damping mechanism 404 utilize at least one common flow channel.

Figure 4E:
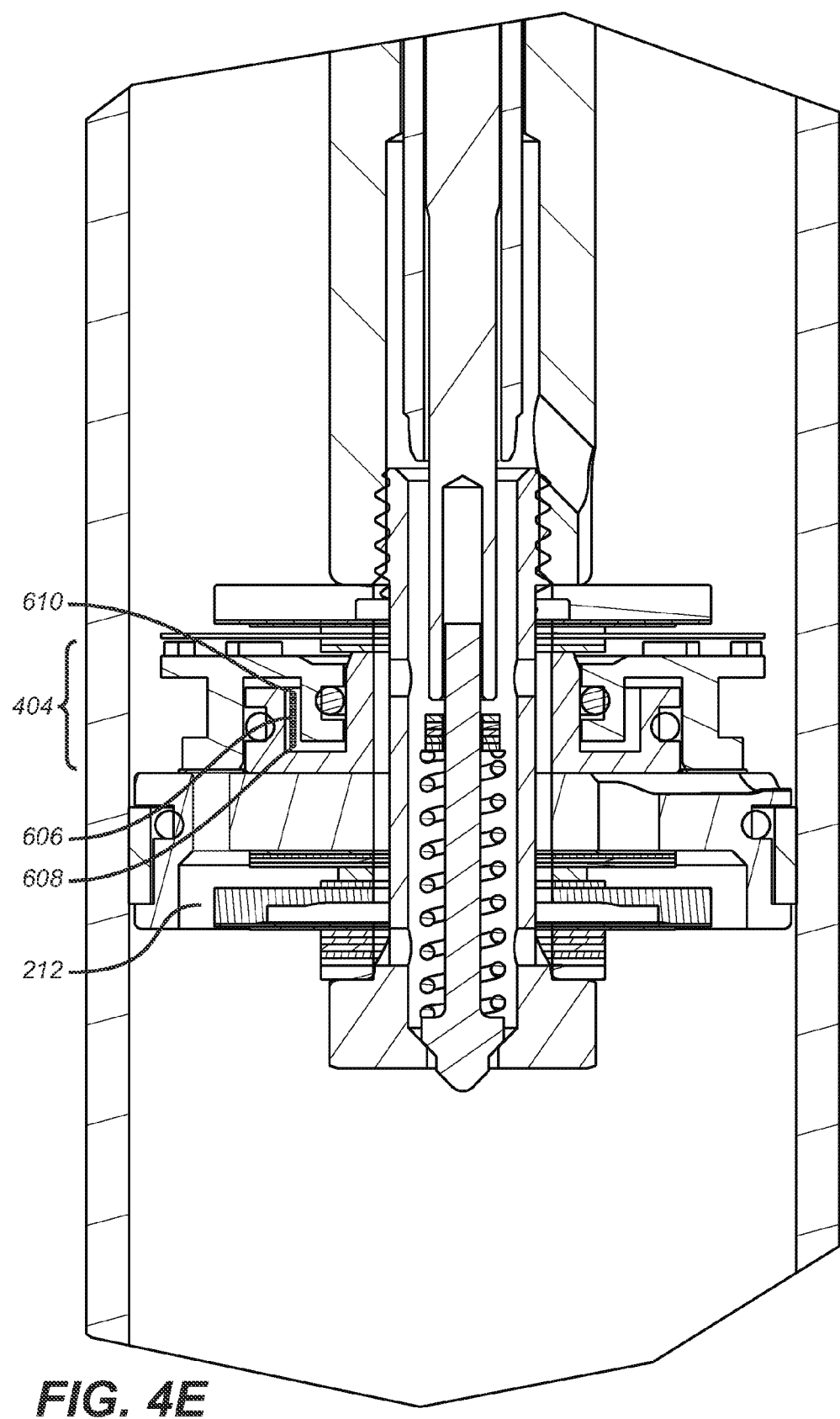

Referring now to FIG. 4E, a valve piston assembly 300 of FIG. 3 with a variable damper spring 606 is shown in accordance with embodiments of the present technology. In one, the fillable chamber 306 comprises a variable damper spring 606 having a first end 608 and a second end 610. The first end 608 is restrained by the valve inner 304 and the second end 610 is restrained by the movable valve outer 302. The variable damper spring 606 is configured for providing resistance to the variable damper 404 that is obstructing the flow channel 212 in response to the compression of the compressible chamber 126. As a result of this resistance, the variable damper spring 606 biases the variable damper 404 towards an open position.

In another embodiment, the variable damper spring 606 is configured to bias the variable damper 404 towards a closed position. In yet another embodiment, variable damper spring 606 is positioned such that the first end 608 and the second end 610 do not engage initially with the initial movement of movable valve outer 302. However, at some point during the travel of movable valve outer 302 towards valve inner 304 or away from valve inner 304, the first end 608 and the second end 610 engage valve inner 304 and movable valve outer 302, respectively. In one embodiment, once engaged, the variable damper spring 606 biases the movable valve outer 302 towards open. In another embodiment, once engaged, the variable damper spring 606 biases the movable valve outer 302 towards closed.

Figure 5:
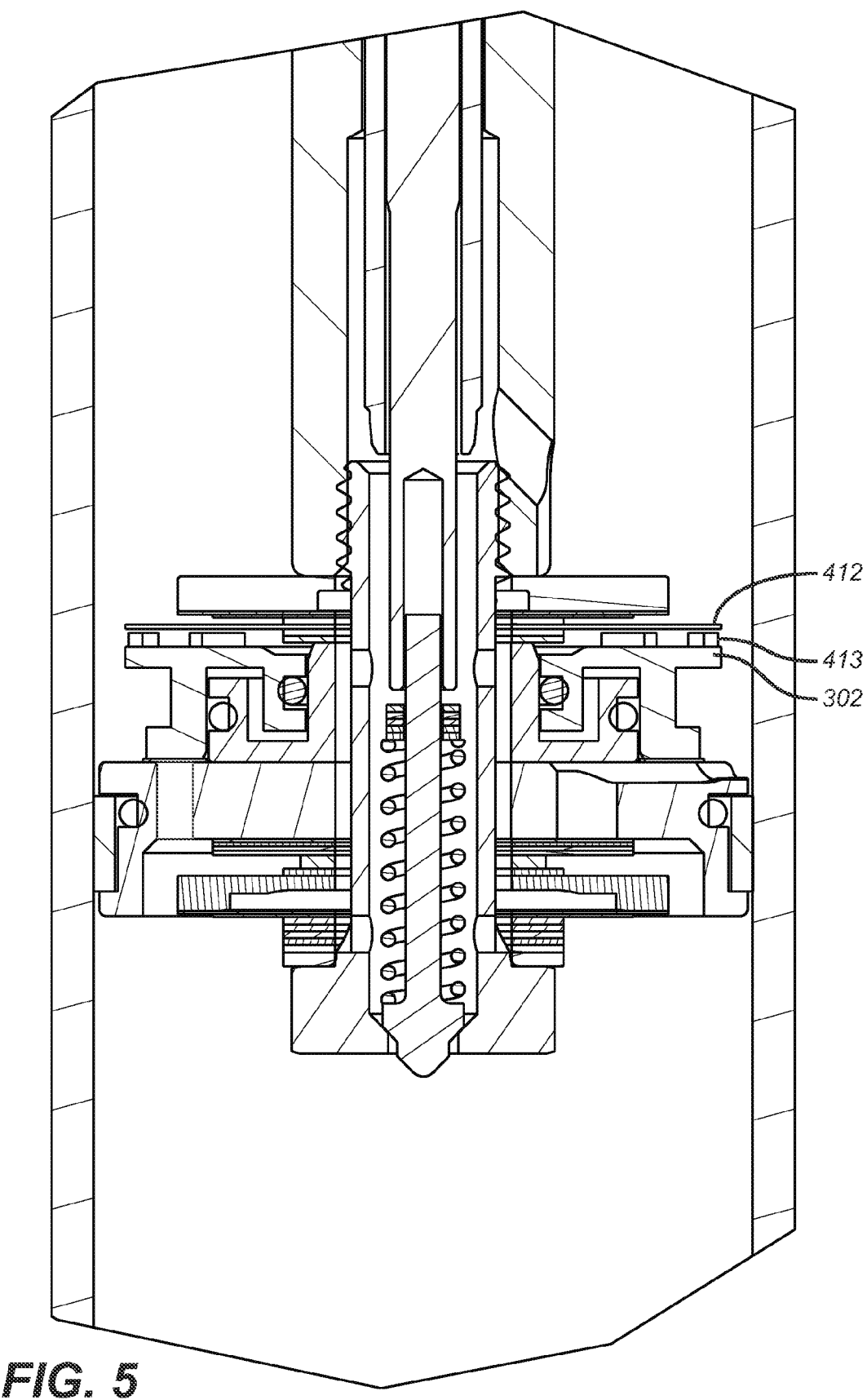
FIG. 5 is a cross-sectional view of a valve piston embodiment as disclosed herein.

In one embodiment of the present technology and referring to FIG. 5, a vehicle suspension damper 400 comprises at least one damping obstruction 412 is shown in accordance with embodiments of the present technology. The damping obstruction 412 is configured to receive an outer portion 413 of the movable valve outer 302 when the movable valve outer 302 moves in response to a stage of the compression of the compressible chamber 126. FIG. 5 shows damping obstruction positioned above movable valve outer 302. In one embodiment, damping obstruction may be one or more "shims". In another embodiment, damping obstruction 412 may be one or more washers.

Figure 6:
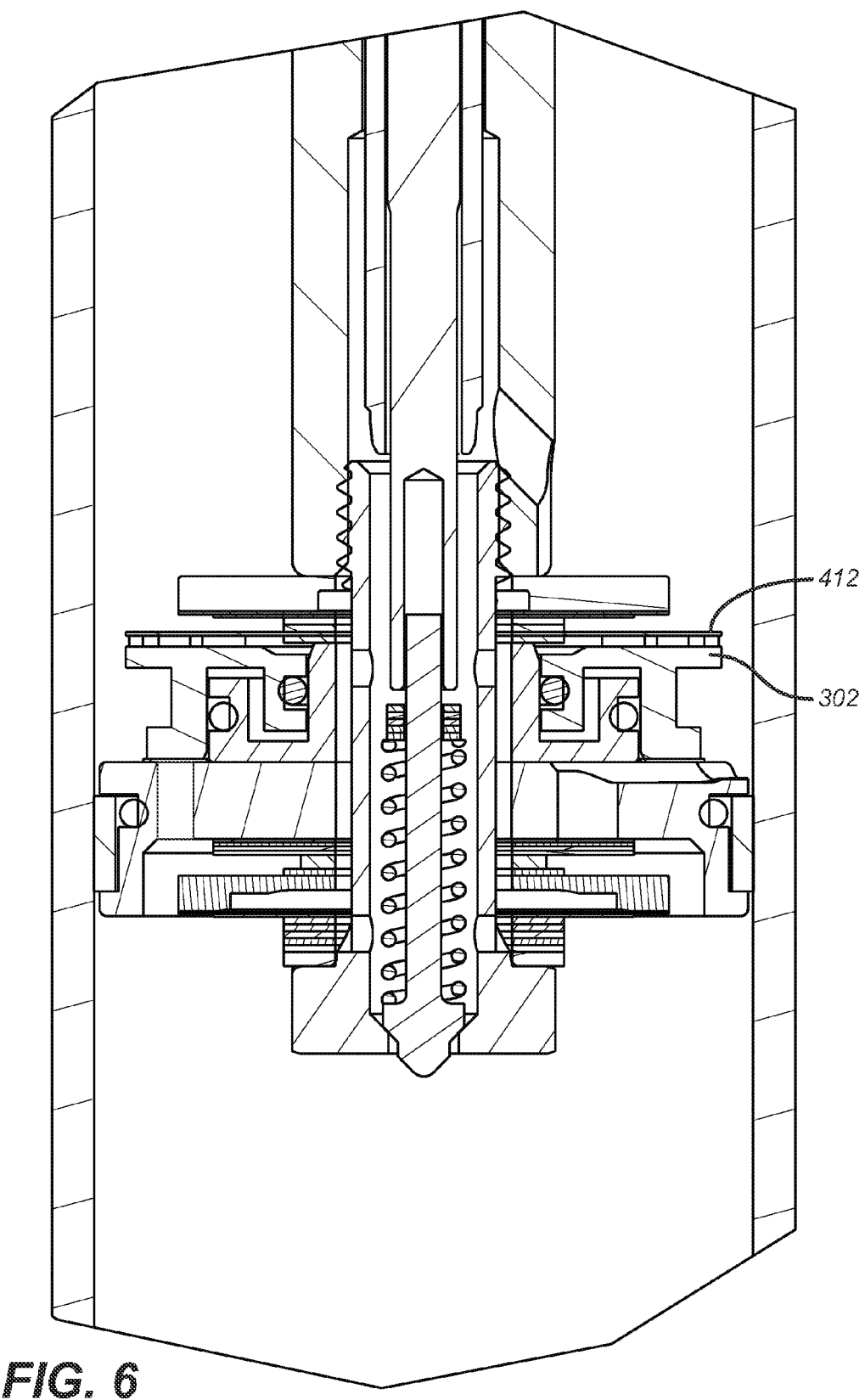
FIG. 6 is a cross-sectional view of a valve piston embodiment as disclosed herein.

Referring now to FIG. 6, a damping obstruction 412 touching movable valve outer 302 is shown in accordance with embodiments of the present technology. It can be seen in FIG. 6 that the damping obstruction 412 biases the movable valve outer 302 towards a closed position. In one embodiment, the damping obstruction 412 is configured for selected engagement with the movable valve outer 302. For example, the damping obstruction 412 may be positioned closer to movable valve outer 302 or further away from movable valve outer 302, thus enabling a predefined timing of engagement. In another embodiment, the damping obstruction 412 is externally adjustable.

Figure 7:
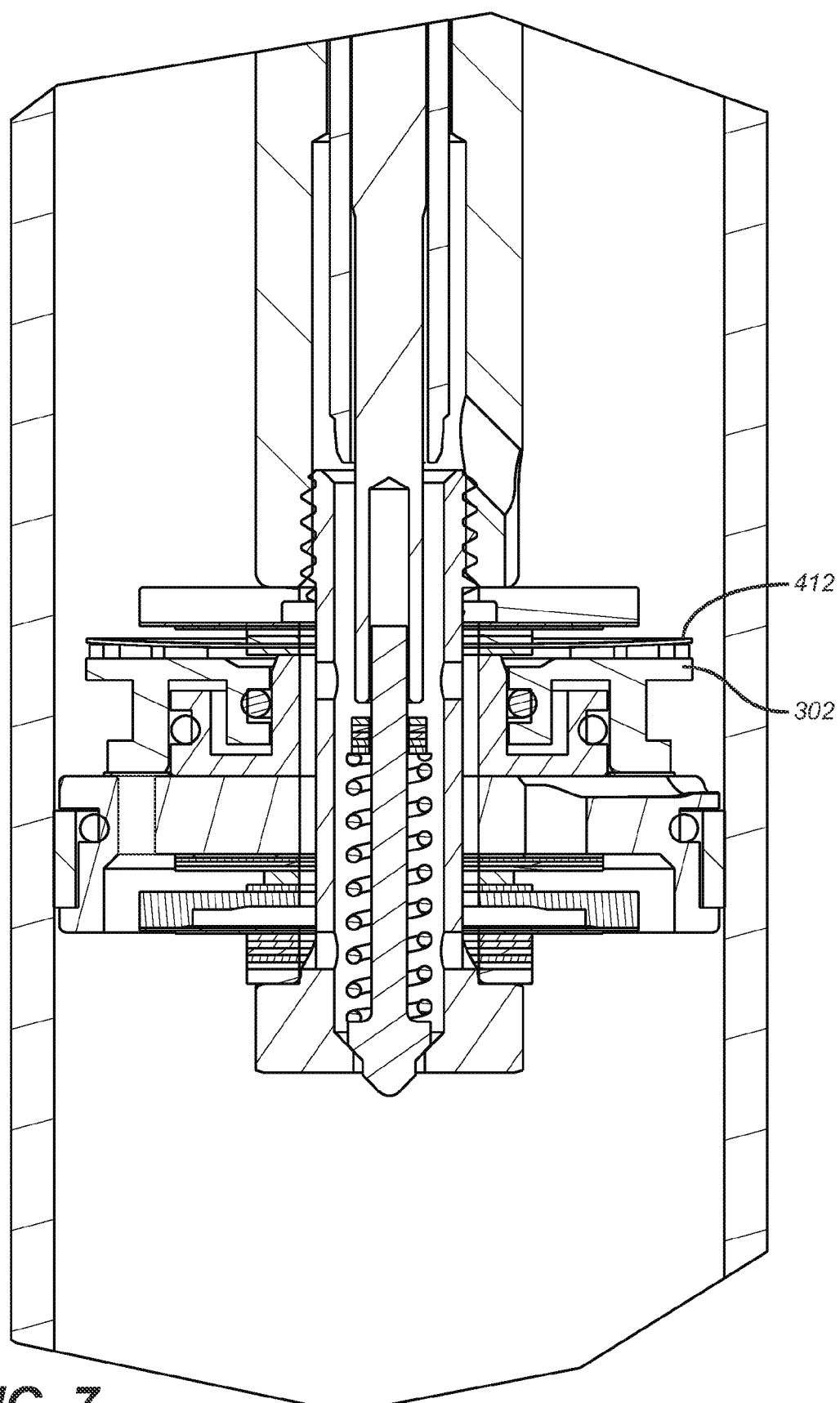
FIG. 7 is a cross-sectional view of a valve piston embodiment as disclosed herein.

Referring now to FIG. 7, a damping obstruction 412 is preloaded and touching movable valve outer 302. For example, FIG. 7 shows movable valve outer 302 wedged against damping obstruction 412 to such an extent that damping obstruction 412 is slightly bent towards the movable valve outer 302. This preloaded position also biases the movable valve outer 302 towards closed.

In one embodiment, the second damping mechanism 404 is responsive to a compression of the compressible chamber 126, wherein the compression results from a selectable input pressure applying pressure. In one embodiment, input pressure is indirectly caused by compression of damping adjustment spring 202. Thus input pressure may be directly or inversely proportional to a stage of compression of the damping adjustment spring 202.

In one embodiment, the vehicle suspension damper 400 is coupled with a nested piston arrangement.

In one embodiment, the vehicle suspension damper 400 comprises an automatic "blow off" feature. The blow off feature is an automatic override permitting the vehicle suspension damper 400 in a "locked out" shock absorber to operate and meter fluid if subjected to a rapid shock event, like a sudden, abrupt bump in a road.

Figure 8A:
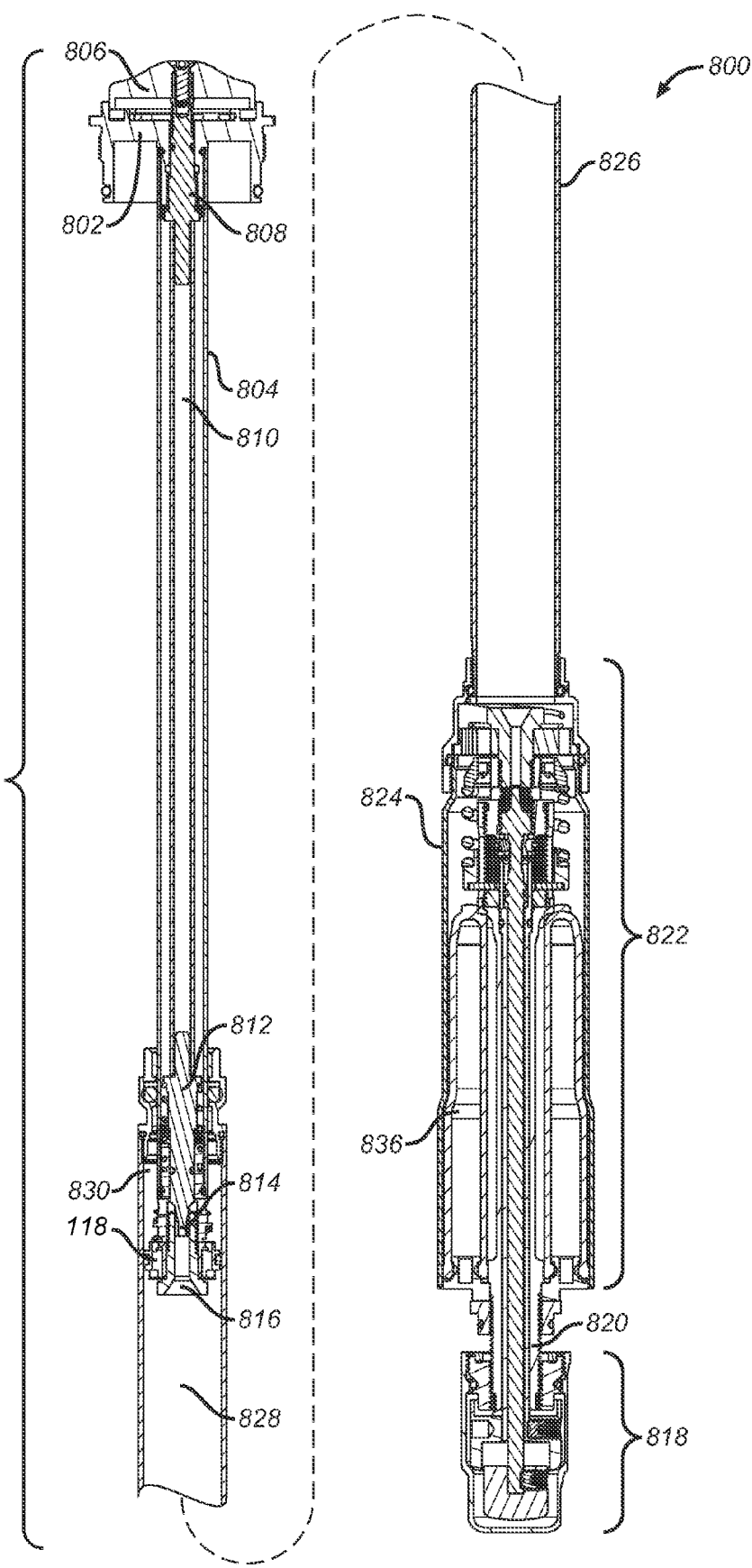
FIG. 8A is a cross-sectional view of a fork damping cartridge embodiment as disclosed herein.

Optionally, any of the features described herein may be adapted for integration in to a bicycle or motorcycle fork. For example, FIG. 14 through 25, of U.S. Pat. No. 7,273,137 (incorporated herein by reference) show an embodiment of a vehicle suspension fork that may be integrated with features hereof. Additionally, U.S. Pat. No. 6,592,136, which patent is herein incorporated by reference in its entirety, shows embodiments of a vehicle suspension fork that may be integrated with features hereof. Additionally, Published U.S. Patent Applications 2007/0119672 A1 and 2007/0007743 A1, each of which applications is herein incorporated by reference in its entirety, show embodiments of a vehicle suspension fork that may be integrated with features hereof FIG. 8A shows a fork damping cartridge that would, in one embodiment, comprise the internal workings of at least one leg of a bicycle fork (or motorcycle fork). The fork damping cartridge is, for example, compatible with a Fox 36 or 40 series trail fork. FIGS. 8H, 8I and 8J are further perspective views of a base valve assembly and the components therein. Although the cartridge may function inside a single legged fork or shock absorber, in one embodiment the cartridge is installed inside one telescoping leg of a two legged vehicle (e.g. bicycle) fork (see FIG. 8B, described below). The top cap 802 includes male threads and an outer diameter o-ring seal. The top cap 802 is threaded into sealing engagement with an inner diameter of an upper fork tube (that extends through a crown, both not shown). The top cap 802 anchors the upper end of the cartridge axially to the upper end of the upper fork tube. The lower end of the cartridge includes a shaft 820 and a nut assembly 818 threaded onto the shaft 820. In one embodiment, the shaft 820 extends through a hole in the bottom of a lower fork tube (not shown) such that the cartridge is substantially inside a combination of the lower fork tube and an upper fork tube (not shown) telescopically engaged therewith. The nut assembly 818 is threaded onto the shaft 820 from outside of the lower fork tube and the cartridge is thereby anchored axially to the bottom of the lower fork tube.

The top cap 802 is connected to piston rod 894 which in turn is connected to piston assembly 118. The top cap 802 carries adjuster knob 806, which is connected to adjuster plug 808. The adjuster plug 808 axially abuts adjustment shaft 810 which in turn axially abuts needle body 812. Needle body 812 includes needle 814 which is disposed in variable axial relation within orifice 816 of the piston assembly 118. The nut assembly 818 is connected to shaft 820, which, through lower damper 822 internal parts, is connected to lower damper body 824 which is in turn connected to damper body 826. Although adjuster knob 806, adjuster plug 808, adjustment shaft 810, needle body 812 and needle 804 are axially movable relative to top cap 802, piston rod 894, piston assembly 118 and orifice 816, all of those move together axially in telescopic relation to damper body 826.

During operation, the damper leg of the fork is subject to compression and rebound loads. The compression is induced by disparities in the terrain being traversed by a vehicle equipped with the fork. The rebound is induced by a spring (e.g. gas spring, mechanical spring, coil—not shown), preferably located in another leg of the fork, which stores energy during compression of the fork and then releases that energy when the disparity is passed. The energy is released in urging the suspension unit to elongate axially following the axial compression during which the energy is stored. The top cap 802 and its connected parts (as disclosed herein) move with the upper fork tube during compression and rebound and the nut assembly 818 and its connected parts (as disclosed herein) move with the lower fork tube.

Movement of the upper fork tube (not shown) relative to the lower fork tube (not shown) causes piston assembly 118 to move axially within the damper body 826. During a compression stoke the piston assembly 118 moves downward in the damper body 826 and thereby reduces the volume of compressible chamber 828. As fluid is displaced from the compressible chamber 828, some of it flows through passages and deflects the one way shim valve to enter the rebound chamber 830. Some of the displaced fluid flows through orifice 816 into the reservoir 822. The resistance to movement of fluid from the compressible chamber 828, through the passages (and shim valve on piston) and orifice 816 provide compression damping for the suspension unit in which the damper cartridge is included.

During a rebound stoke the piston assembly 118 moves upward in the damper body 826 and thereby increases the volume of compressible chamber 828. As fluid is displaced from the rebound chamber 830, it flows through apertures and into an annular volume. It then flows past needle 814, through channels and orifice 816 to enter the compressible chamber 828. Also, the previously displaced fluid flows through orifice 816 from the reservoir 822 and back into the compressible chamber 828. The resistance to movement of fluid from the rebound chamber 830, through the channels and orifice 816 provide rebound damping for the suspension unit in which the damper cartridge is included.

As an alternative to or augmentation of an internal floating piston, annular bladder 836 (e.g. "flexible bladder") is located within reservoir 822 and provides a compensation chamber for the volume of shaft 820 as it enters compressible chamber 828 during compression. The annular bladder 836 comprises an elastic material or structure, for example an elastomeric toroid or semi-toroid or a metallic or plastic bellows or any other suitable structure or material. An interior of annular bladder 836 is charged with a compressible fluid at an initial pressure. Optionally, the annular bladder 836 may remain at atmospheric pressure as is described elsewhere herein. As shaft 820 enters compressible chamber 828 during compression, fluid flows from compressible chamber 828 into reservoir 822 and the volume of annular bladder 836 is reduced correspondingly as the gas within annular bladder 836 is compressed. Such gas compression correspondingly raises the ambient pressure within the compressible chamber 828 and rebound chamber 830.

In one embodiment, the annular bladder 836 acts as the floating piston assembly 122 of FIG. 1. In one embodiment, the annular bladder 836 may be pressurized from a source outside of the fork. Additionally, in one embodiment of a vehicle suspension damper 400 in a leg of a fork, the variable damper is coupled with a piston assembly 118. In another embodiment, the variable damper is coupled with a ported bulkhead.

According to one embodiment, valve piston assembly 300 of FIG. 3 (including a valve assembly and a piston assembly) is placed on the shaft 114 to integrate with the assembly of FIG. 8A. Optionally, the adjustment body 812 of FIG. 8A may be used in conjunction with the piston assembly 300 of FIG. 3 or the entire piston assembly 300 of FIG. 3 may be used in the fork of FIG. 8A, including the damping adjustment valve 204 in aperture 206 of FIG. 2. In operation, the valve piston assembly 300 increasingly restricts flow through flow channel(s) 212 as the gas compression in annular bladder 836 raises the ambient pressure within compressible chamber 828 and rebound chamber 830 during a compression stroke. Of note, in one embodiment the piston assembly in the fork is replaced by the boost valve type piston assembly.

Figure 8B:
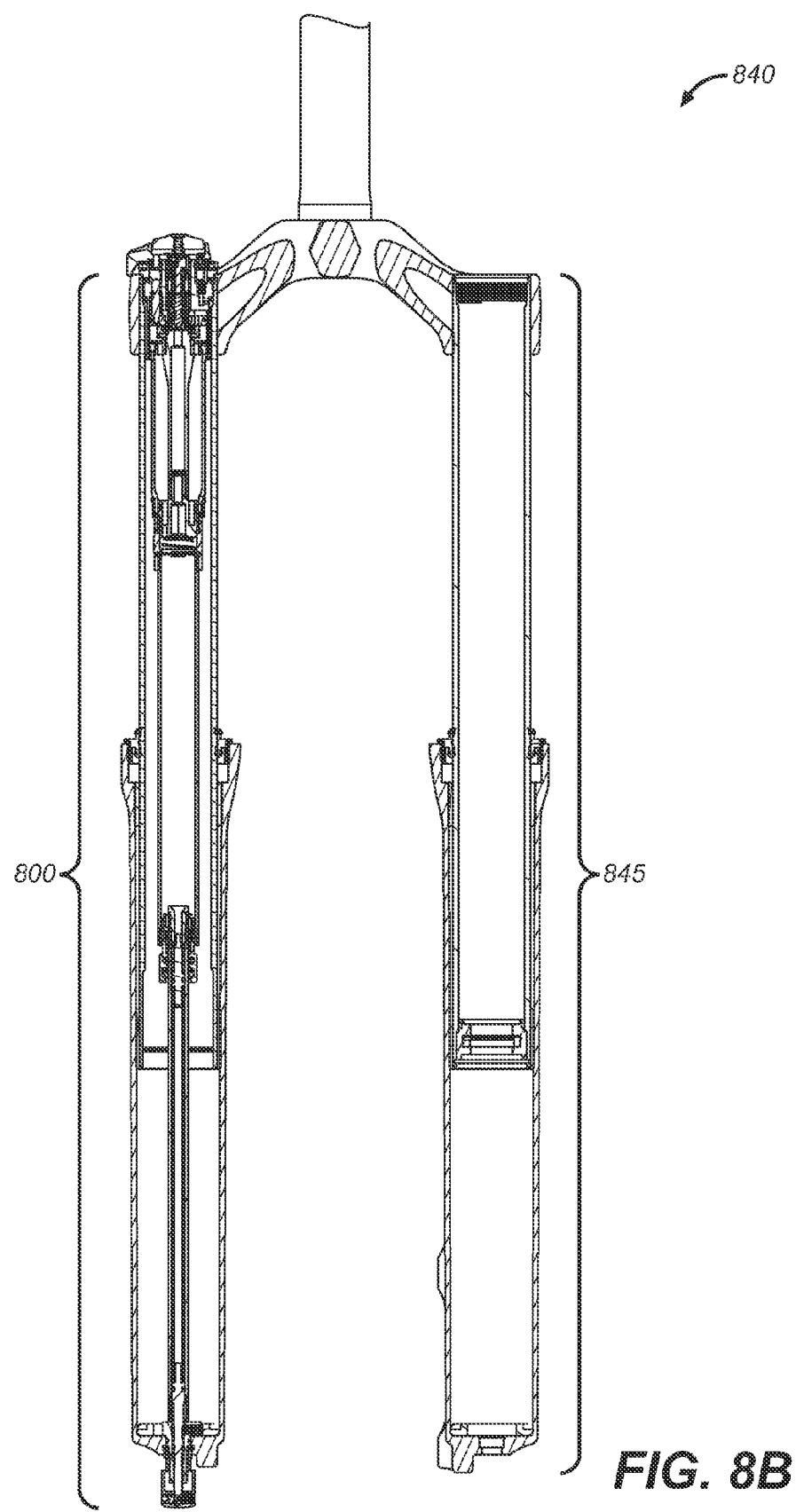
FIG. 8B is a cross-sectional view of a two legged vehicle (e.g. bicycle) fork comprising a vehicle suspension damper embodiment as disclosed herein.

Referring now to FIG. 8B, a two legged vehicle (e.g. bicycle) fork 840 comprising a vehicle suspension damper is shown in accordance with embodiments of the present technology. For example, and as described herein, the cartridge of FIG. 8A may be installed in one leg of fork 840. In one embodiment and as shown in FIG. 8B and as described herein, one leg 800 may include the vehicle suspension damper 400 and the other leg 845 of fork 840 may include a spring (e.g. gas spring, mechanical spring, coil—not shown), which stores energy during compression of the fork and then releases that energy when a disparity is passed. In one embodiment, the spring is adjustable.

In one embodiment, forks 800 and 840 comprise boost valves. In another embodiment, forks 800 and 840 comprise pressurized boost valves. For example, areas within forks 800 and 840 that are capable of holding matter may be "pressurized" from an outside source with air, gas, and/or liquid.

Figure 8C:
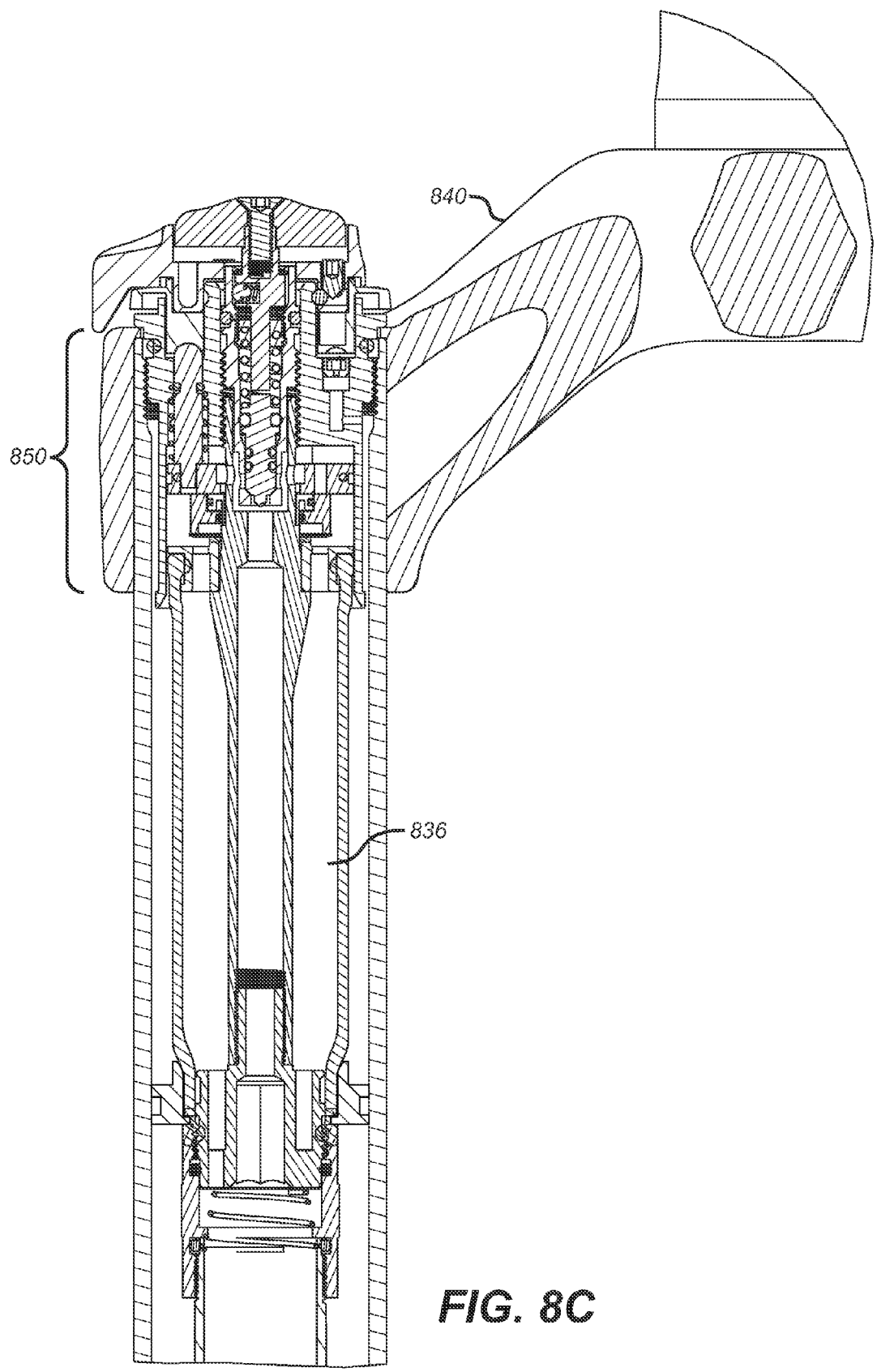
FIG. 8C is a cross-sectional view of a vehicle suspension damper and related components within a leg of a two legged fork embodiment as disclosed herein.

Referring now to FIG. 8C, a cross-sectional view of a vehicle suspension damper and related components within a leg of a two legged fork is shown in accordance with embodiments of the present technology. The annular bladder 836 within reservoir 822 can be clearly seen. Of note, the annular bladder 836 is coupled with the top end and the variable damper coupled with the upper bulkhead 850.

Figure 8D:
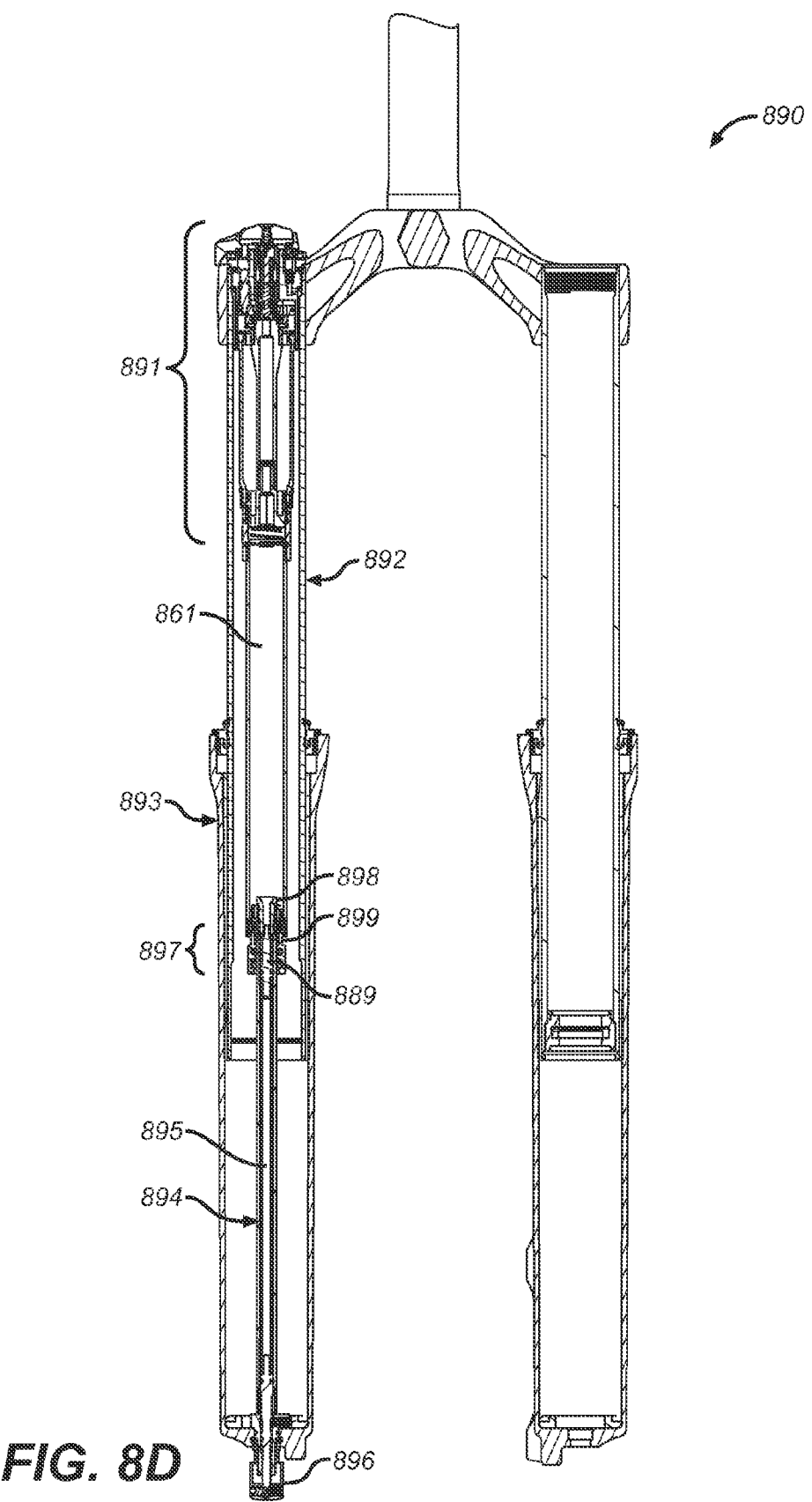
FIG. 8D is a cross-sectional view of a two legged vehicle (e.g. bicycle) fork comprising a vehicle suspension damper embodiment as disclosed herein.
Figure 8E:
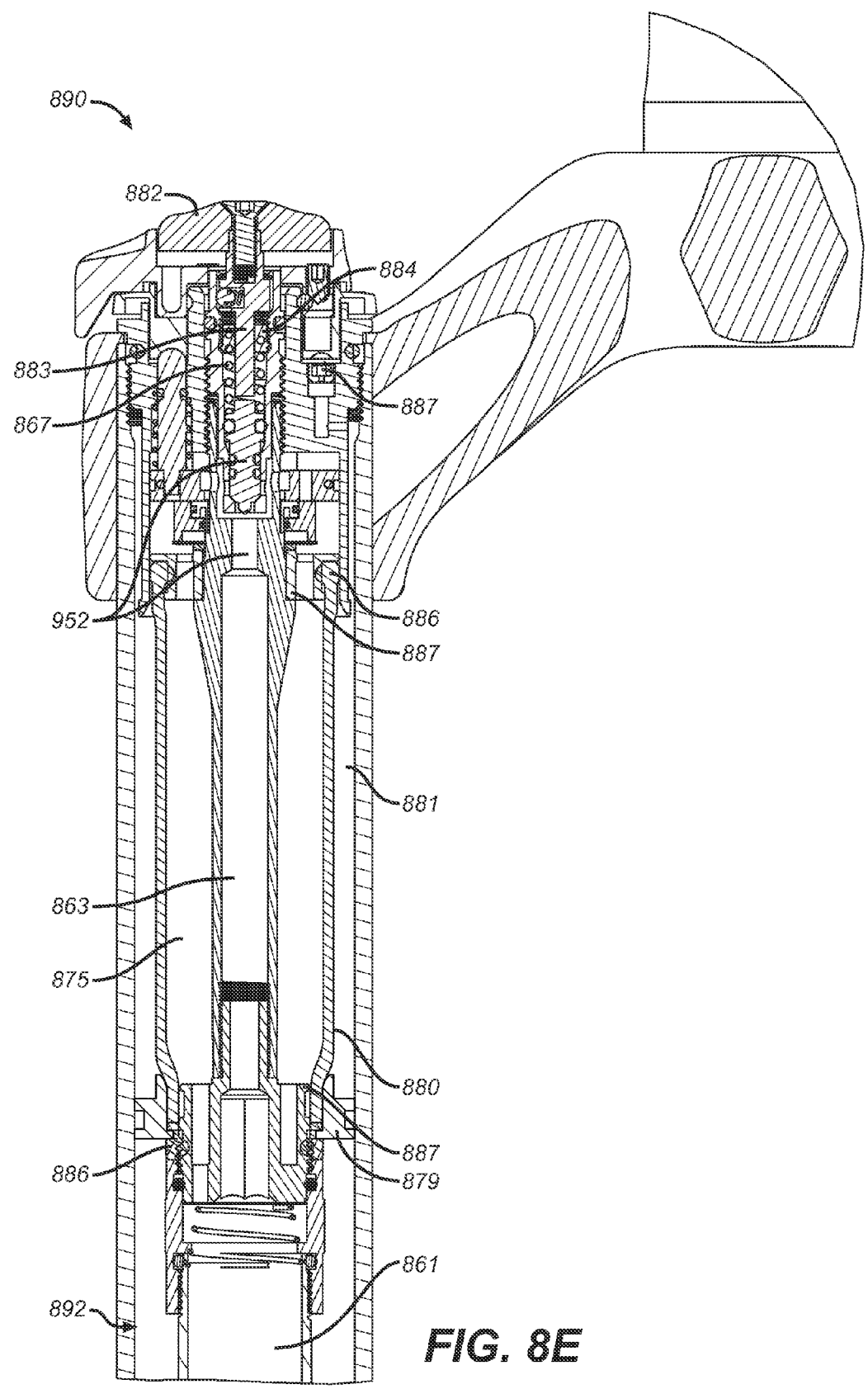
FIG. 8E is a blown up view of the cross-sectional view of FIG. 8D of a two legged vehicle (e.g. bicycle) fork comprising a vehicle suspension damper embodiment as disclosed herein
Figure 8F:
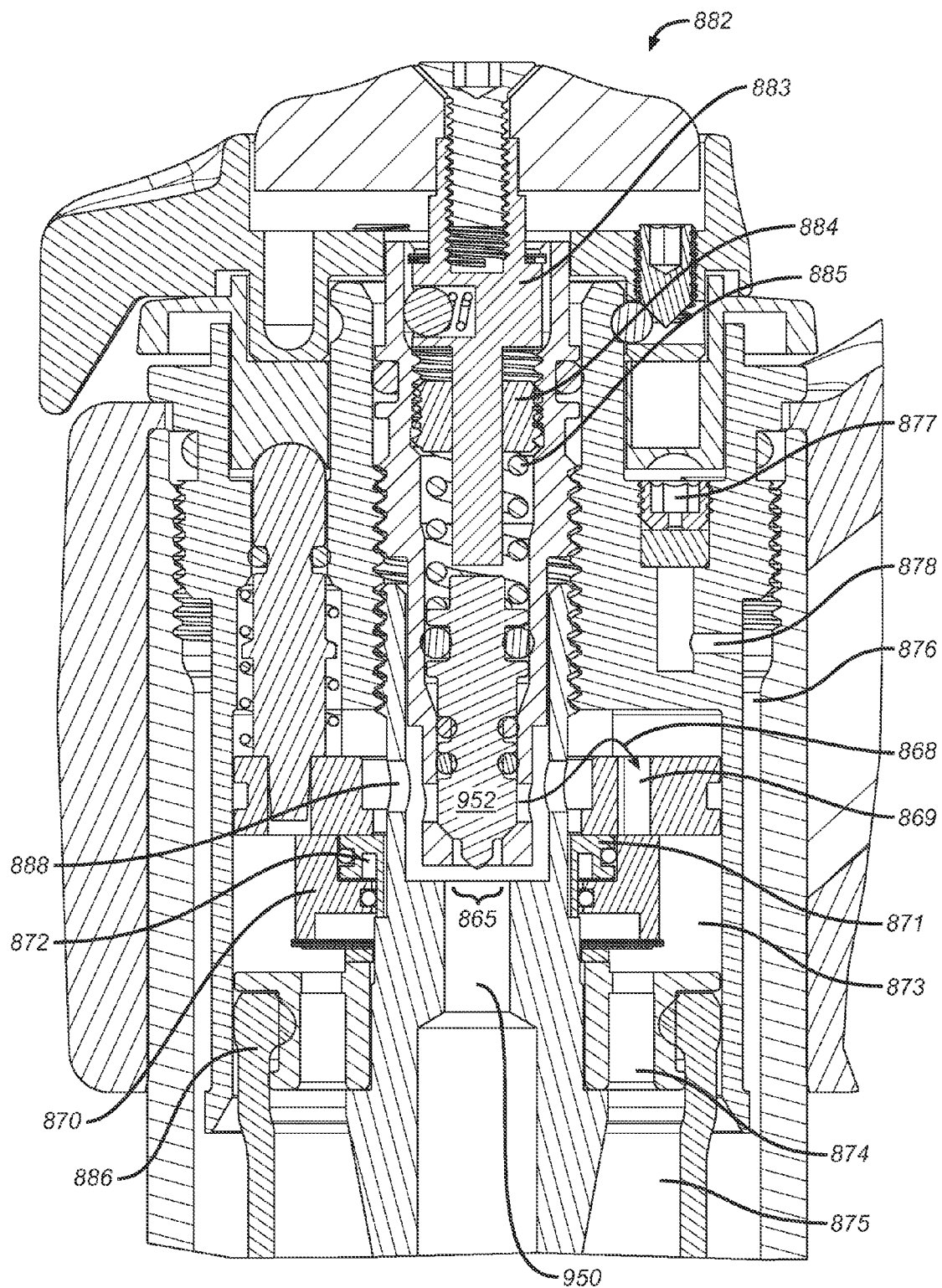
FIG. 8F is a blown up view of the cross-sectional view of FIG. 8E of a two legged vehicle (e.g. bicycle) fork comprising a vehicle suspension damper embodiment as disclosed herein

In one embodiment, as shown in FIG. 8F, the boost valve pair (movable valve outer 870 and valve inner 871, is mounted in a control assembly 891 of a vehicle fork 890. The control assembly 891 is shown in greater detail in FIGS. 8E and 8F. Referring to FIG. 8D, the fork 890 includes an upper tube 892 telescopically received within a lower tube 893 and axially slidable relative thereto. The lower tube 893 includes a piston rod 894 having a damping valve adjustment shaft 895 disposed coaxially therein and axially and rotationally movable relative thereto. The damping valve adjustment shaft 895 moves axially in response to rotation of the damping adjustment knob 858 and thereby adjusts the interference of needle valve 889 within a damping orifice that extends through the center of the damping piston 898. The damping valve adjustment knob 896 is fixed to the lower end of the damping valve adjustment shaft 895 where the damping valve adjustment knob 896 is accessible from an exterior of the fork and in one embodiment is suited for manipulation by hand thereby allowing manual adjustment of the mechanical damping valve 897. The damping valve adjustment knob 896 is threaded through the lower end of the lower tube 893. When the damping valve adjustment knob 896 is selectively rotated by a user, a shaft of the damping valve adjustment knob 896 moves axially in proportion to the thread helix and the shaft pushes or pulls on the damping valve adjustment shaft 895. The damping piston 898 (e.g. orifices there through) controls the flow of fluid from the compression side of compression chamber 861 of the damping fluid chamber to the rebound chamber 899 of the damping fluid chamber during a compression of the fork 853 and vice versa during an extension of the fork 890 thereby providing a selectable damping resistance. Optionally, a spring (not shown) is included between the damping valve adjustment shaft 895 and the needle valve 889 so that during compression of the fork 890, a threshold pressure in compression chamber 861 can overcome the preset or selected spring force (based on adjustment of the damping valve adjustment knob 896), thereby allowing the fork 890 to "blow off" or allow damping fluid to flow through (to rebound chamber 899) an otherwise substantially closed piston orifice. The damping piston 898 may also comprise a variable damper (boost valve) such as that shown and described herein for example in FIG. 4A.

During compression of the fork, the damping valve adjustment shaft 895 progresses into the compression/rebound chamber 861/899 and as it does it must, because the compression/rebound chamber 861/899 is of fixed volume, displace a volume of fluid (typically "incompressible" damping liquid such as hydraulic oil) corresponding to the volume of the damping valve adjustment shaft 895 as it enters the compression/rebound chamber 861/899. The displacement of damping fluid from the compression/rebound chamber 861/899 affords an additional damping feature. Referring also to FIGS. 8E and 8F, the displaced fluid flows from compression chamber 861 into chamber 863. From there it continues into throat 950 to orifice 865. When the damping fluid pressure at orifice 865 is sufficient to overcome the metering valve 952 preload spring 867, the damping fluid flows through orifice 865 and along flow paths 868 (through a plurality of apertures 888 disposed circumferentially about the throat 950 body) into a plurality of boost valve orifices 869. The plurality of boost valve orifices 869 are obstructed at a lower end by movable valve outer 870. The movable valve outer 870 is "nested" with the valve inner 871 and an annular fluid chamber 872 is formed between the movable valve outer 870 and the valve inner 871. In one embodiment the annular fluid chamber 872 is filled by gas at atmospheric pressure. When the static or "ambient" pressure of the damping fluid is greater than atmospheric, it acts to force the movable valve outer 870 upwardly and the valve inner 871 downwardly. In other words, movable valve outer 870 and valve inner 871 tend to become more tightly "nested." That in turn forces movable valve outer 870 against the plurality of boost valve orifices 869. The greater the differential pressure between the damping fluid and the annular fluid chamber 875, the greater the force will be that is exerted by the movable valve outer 870 against the plurality of boost valve orifices 869. That in turn will increase resistance to damping fluid flow through the plurality of boost valve orifices 869 toward flow path 873 and will thereby increase the compressive damping force of the fork 853. Damping fluid flowing through flow path 873 and flow path 874 then flows into the annular fluid chamber 875 where its pressure may be affected by gas pressure in annular chamber 876.

In one embodiment the annular fluid chamber 872 (or 306 of FIG. 3, referred to as a "fillable chamber") is filled with substantially nothing and therefore contains a vacuum. That may be accomplished by engaging or "nesting" the movable valve outer 870 and the valve inner 871 in a vacuum or by pumping the annular fluid chamber 872 down through an orifice (not shown) and then plugging the orifice. When annular fluid chamber 872 is at vacuum, mere atmospheric pressure will be higher. In one embodiment pressurization of the shock absorber or fork leg (e.g. through gas induction valve 877 into annular chamber 876) may be atmospheric or slightly above atmospheric. In one low pressure embodiment the annular bladder 880 or floating piston 122 (of FIG. 1) is desirable in order to isolate a minimized volume of gas for facilitating pressure increases during a compression stroke of the suspension. In one embodiment the annular fluid chamber 872 serves to isolate the gas compensation chamber from the damping fluid thereby avoiding any intermingling of the gas and the fluid (e.g. liquid oil) which would result in a reduced damping performance (due to the damping fluid becoming emulsified).

In one embodiment the annular fluid chamber 872 (or 306 of FIG. 3, fillable chamber) is filled with gas at above atmospheric pressure whereby such gas pressure is specified to be greater than an initial (corresponding to an extended state of the suspension) static damping fluid pressure and corresponding gas pressure within annular chamber 876 (or 126 of FIG. 1, referred to as a "compensation chamber"). In such an embodiment the gas in annular fluid chamber 872 (or 306 of FIG. 3, fillable chamber) biases the movable outer valve and the valve inner 870 (302 of FIG. 3) and 871 (304 of FIG. 3) away from one another (e.g. increasing gap 312 of FIG. 3) until the suspension is stroked sufficiently in compression to raise the static damping fluid pressure to a value higher than that annular fluid chamber 872 (306 of FIG. 3, fillable chamber) gas pressure. In one embodiment the boost valve damping mechanism is held open until a predetermined point in the compression stroke is reached. In such embodiment the suspension exhibits very compliant damping characteristics until later in the compression stroke at which point the suspension becomes more rigid (and in that way suspension "bottom out" may be mitigated). In one embodiment a mechanical spring is placed within the annular fluid chamber 872 (306 of FIG. 3, fillable chamber) such that it is in compression between the movable valve outer 870 and valve inner 871 halves and biases them to move apart in a manner, and with a result, similar to the foregoing description (except that the spring rate may be more linear than an initial gas pressure charge "spring").

In one embodiment the volume of annular chamber 876 (or 126 of FIG. 1, compensation chamber) is configured in proportion to the diameter of damping valve adjustment shaft 895 (114 of FIG. 1, referred to as "shaft") and the length of the suspension stroke or the length of the damping valve adjustment shaft 895 (114 of FIG. 1, shaft) that will, at most, enter into compensation/rebound chamber 861/899 (or 124 of FIG. 1, referred to as "damping fluid chamber"). Such a consideration may be referred to as the "damper compression ratio." In one embodiment the volume of the annular chamber 876 (126 of FIG. 1, compensation chamber) is twice the volume of the piston rod 894 (114 of FIG. 1, shaft) that may enter the compression/rebound chamber 861/899 (124 of FIG. 1, damping fluid chamber) at maximum compression stroke of the suspension or in other words the damper compression ratio is two ([volume of the compensating chamber] divided by the [shaft volume maximum minus shaft volume [in the damping chamber] initial]). In some boost valve suspension embodiments, useful compression ratios range from 1.5 to 4. In some embodiments more particular useful compression ratios range from 2 to 3. In some fork embodiments, compression ratios may be relatively lower in a range because a fork typically operates within a vehicle system on a one to one basis (i.e. the wheel moves an inch and the fork moves an inch whereas a shock may move ½ inch per 2 inch of wheel travel thereby increasing the inch per inch resistance required of an effective shock: there is no levering linkage usually associated with a fork where there is often linkage associated with a rear shock).

The static or ambient pressure of the damping fluid may be altered by pressurizing (in one embodiment with a compressible fluid such as a gas) the piston shaft compensation chamber. In one embodiment compensation chamber is pressurized by adding gas, at a desired damping fluid ambient pressure, through gas induction valve 877. Gas induction valve 877 may be a rubber plug under a set screw, a Schrader type gas valve, a Presta type gas valve or any valve suitable for gas introduction and sealing at pressure. When the gas is introduced into gas induction valve 877, it flows through orifices 878 and into annular chamber 876. In one embodiment annular chamber 876 is sealed at a lower end by an annular partition 879 and sealed in order to limit the volume of pressurized gas influencing the dimension of the upper tube 892 (if the upper tube 892 is completely pressurized dimensional changes and possible binding between fork legs may occur).

The pressurized gas acts almost without resistance on the damping fluid through annular bladder 880. In one embodiment the annular bladder 880 is made from an elastomer (or other suitable flexible material) and acts as a pressure transmitting diaphragm (annular) between the gas in annular chamber 876 and the damping fluid in annular bladder interior 875. Because the damping fluid in annular bladder interior 875 is in pressure communication with the entire damping fluid system including compression/rebound chamber 861/899, communication of gas pressure in annular chamber 876 to fluid pressure in annular bladder interior 875 (through annular bladder 880) increases the ambient damping fluid pressure to that of the gas pressure of chamber 881. As described herein, that ambient pressure influences the damping force exerted by boost valve or valves included within the fork (e.g. 870/871). As the fork 853 compresses during a compression stroke, the volume of damping fluid displaced by damping valve adjustment shaft 895 acts to further increase the ambient damping fluid pressure in the system by compressing the gas in chamber 881 by an amount corresponding to the damping valve adjustment shaft 895 introduced into compression/rebound chamber 861/899.

In one embodiment, the vehicle fork 890 includes an adjustable damping mechanism comprising a metering valve 952. That metering valve 952 can be adjusted by rotation of top cap 882 which correspondingly rotates adjuster 883. The shaft of adjuster 883 is non round and engages a similarly non round hole though nut 884. When adjuster 883 is rotated, the nut 884 is rotated and also traverses its threaded housing axially. As the nut 884 moves axially, the preload on spring 885 is correspondingly altered. Because the spring 885 exerts an axial load on the metering valve 952, the damping characteristic, or resistance to flow though orifice 865 is selectively and manually adjusted by turning top cap 882.

In one embodiment the annular bladder 880 may be constructed from extruded or pulltruded (or other suitable continuous tube forming operation or method) tube stock cut in segments to suitable length. Such manufacturing option may reduce costs per bladder and increase the bladder material and property options available. In one embodiment the bladder may be so constructed by virtue of the mechanism employed herein to create a fluid tight seal at each end of the bladder. As shown in FIGS. 8E and 8F, bladder end 886 is upset and the upset end is captured by seal ring 887. During installation, seal ring 887 is pressed into the inner diameter at an end of annular bladder 880 such that it straddles the upset bladder end 886. The bladder end 886, with seal ring 887 installed is then slid axially into an inner diameter of a solid cylindrical housing, such as for example the inner diameter of annular partition 879 (or at an upper end, a "control assembly housing" (not numbered but shown). The solid housing (e.g. 879) and seal ring 887 are dimensioned such the annular space formed between them is radially thinner than the thickness of the upset bladder end 886 thereby placing the elastic upset in a sealing squeeze (such as an o-ring mechanism would function).

In one embodiment the bladder stock may be extruded from a suitable elastic material and then cut to appropriate length. The lengths may then be upset by a secondary upsetting process (e.g. using heat and pressure). Optionally the upsetting is not necessary and the seal ring 887 and inner diameter of the annular partition 879 are designed to squeeze, in sealing engagement, the mere thickness of the bladder stock where such squeeze is also sufficient to resist axially loading and "shrinkage" forces that may occur when the bladder is internally pressurized (to expand radially).

Figure 8G:
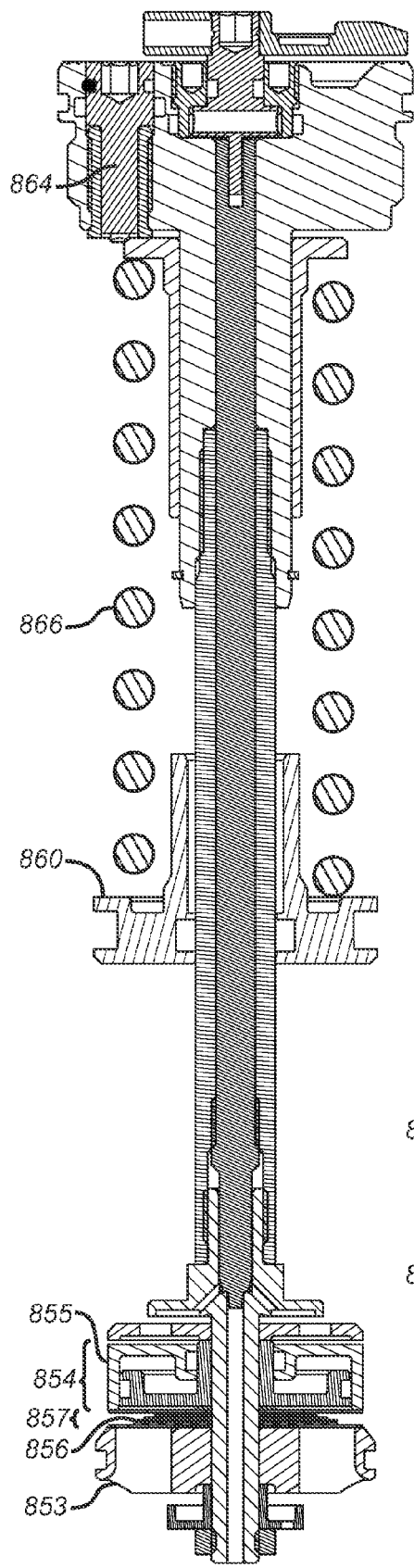
FIG. 8G is a cross sectional view of a vehicle suspension damper and related components within a fork 852 configured for a motorcycle.
Figures 1, 8G:
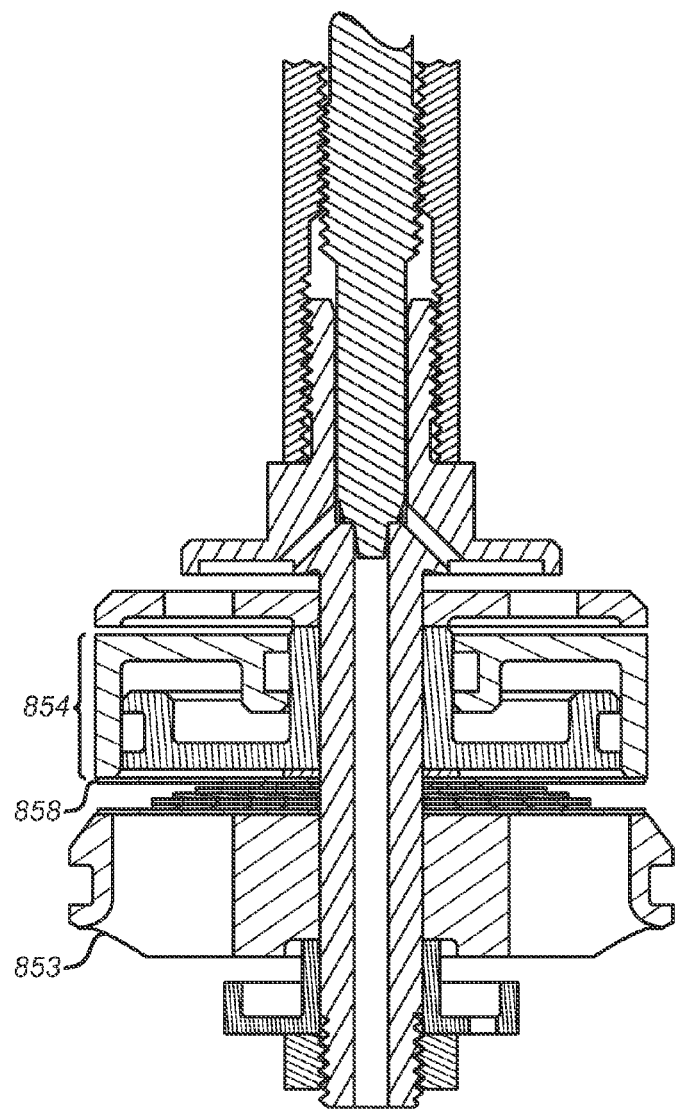
Figure 8H:
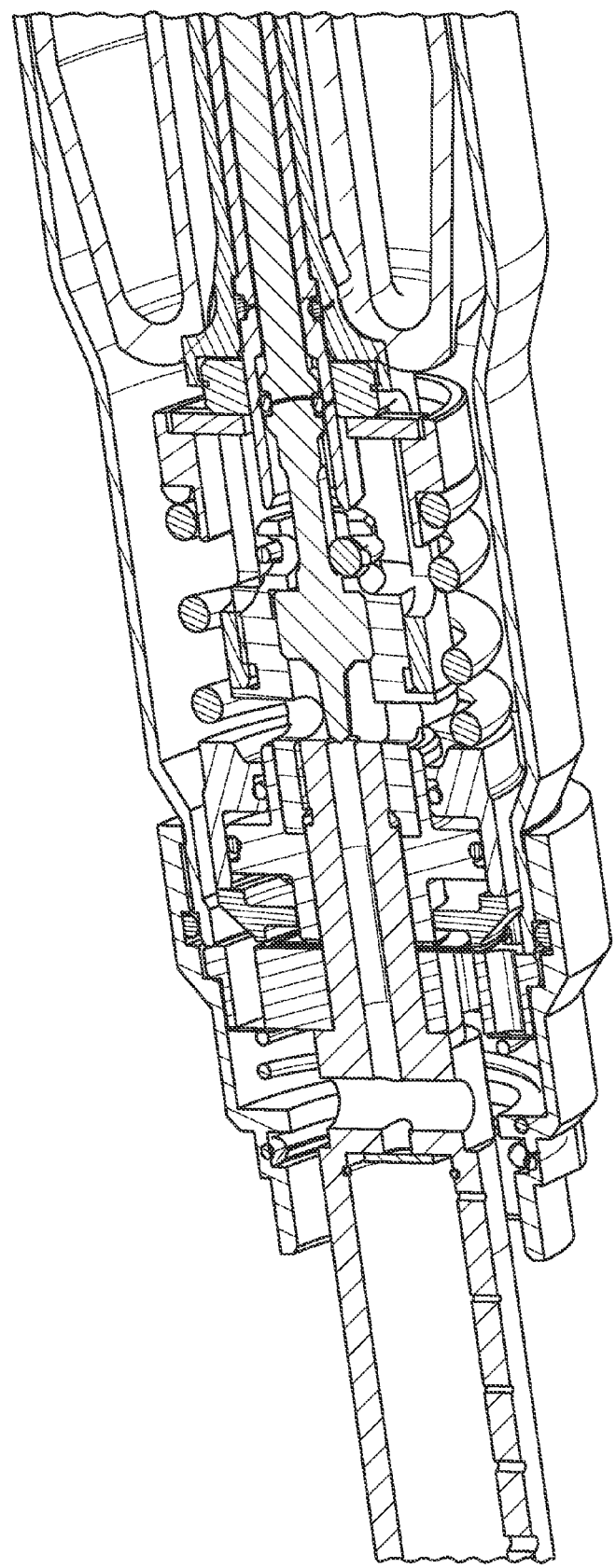
FIG. 8H is a cross sectional view of components within a base valve assembly embodiment as disclosed herein.
Figure 8I:
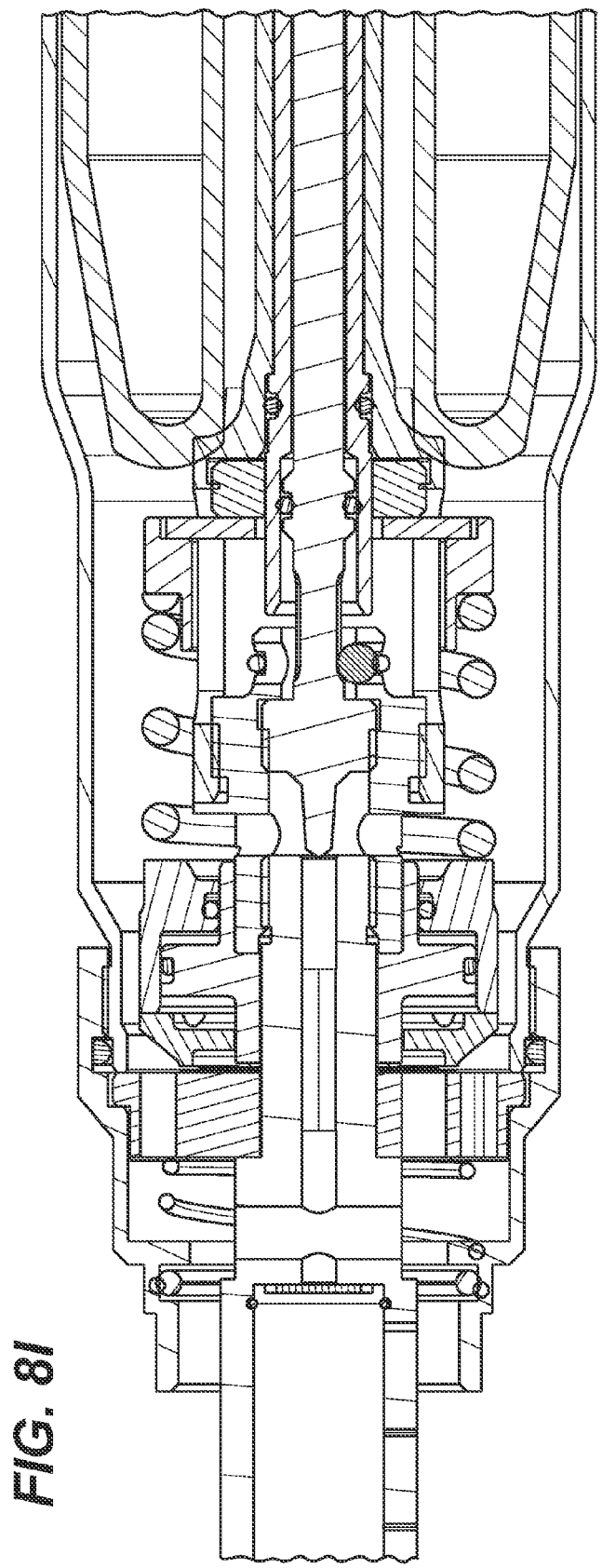
FIG. 8I is a cross sectional view of components within a base valve assembly embodiment as disclosed herein.
Figure 8J:
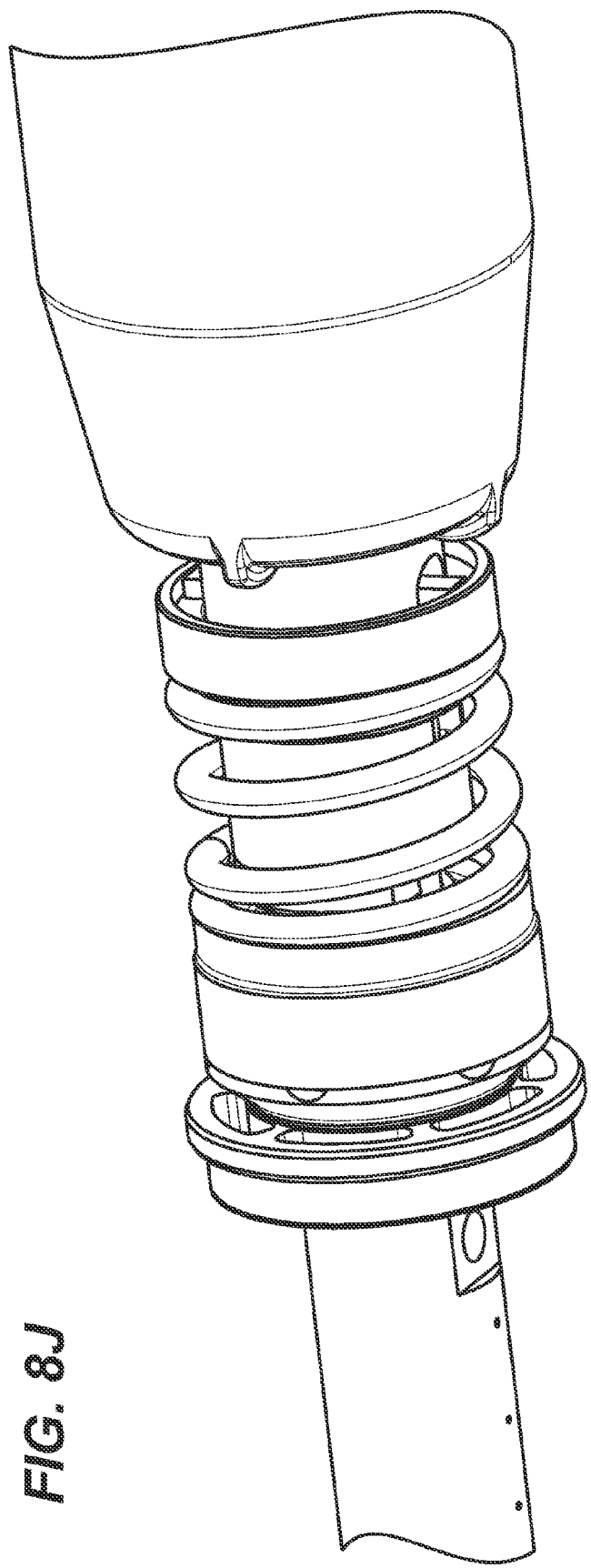
FIG. 8J is a cross sectional view of components within a base valve assembly embodiment as disclosed herein.

Referring now to FIG. 8G, a cross sectional view of a vehicle suspension damper and related components within a fork 852 configured for a motorcycle is shown in accordance with embodiments of the present technology. Shown in fork 852 are the following components: piston assembly 853, variable damper 854, movable outer valve 855, reverse bend shim 856, main stack of shims 857, the first big diameter shim 858 furthest from the piston assembly 853, IFP chamber 860 (similar in function to the damping fluid chamber 124 of FIGS. 1-7, compression bleed adjuster 862, spring pre-load adjuster 864 and IFP spring 866.

In operation, the variable damper 854 acts against a reverse bend shim 856 arrangement. As the pressure in the IFP chamber 860 increases due to compression of the fork 852, the movable outer valve 855 pushes against the first big diameter shim 858 furthest from the piston assembly 853. The first big diameter shim 858 bends against the main stack of shims 857, effectively increasing the stiffness of the main stack of shims 857 as the fork 852 is compressed.

At the beginning of travel, when the pressure of the IFP chamber 860 is at a minimum, the variable damper 854 is not influencing the damping force. At some point into the travel, when the reverse bend shim 856 assembly starts to engage the stack, is when the variable damper 854 starts acting. This gives initial free movement of the fork 852 and then produces the position-sensitive effect to the compression damping deeper in travel.

Of note, external adjustments may be made to the components of fork 852. For example, a compression bleed adjuster 862 is coupled in parallel with variable damper 854. The compression bleed adjuster 862 is configurable to be adjusted externally. In addition, in one embodiment, there is a spring pre-load adjuster 864 which acts to change the pre-load on the IFP spring 866. In one embodiment, turning the spring pre-load adjuster 864 clockwise will increase the pre-load on the IFP spring 866 and make the variable damper 854 react closer to the initial part of its travel. Turning the spring pre-load adjuster 864 will control the dive or pitch of the fork 852 (most notable in the corners).

Another external adjustment that may be made in accordance with embodiments of the present technology is to alter the height of the external oil bath. Raising the oil height will increase the ramping of the air volume in the fork 852, thus increasing the apparent pressure of the IFP chamber 860. Most likely, this adjustment will affect the last few inches of travel.

Embodiments in accordance with the present technology may be described as follows. In one embodiment, a vehicle suspension fork comprises a damping fluid chamber having a variable volume; a reservoir chamber in fluid communication with the damping fluid chamber; a flow restriction disposed in a flow path between the damping fluid chamber and the reservoir chamber; and a compressible chamber separated from the reservoir chamber by a flexible bladder.

Furthermore, in one embodiment, the flexible bladder (annular bladder) comprises an elastic material.

In another embodiment, the fork described herein comprises a first outer tube and a second outer tube telescopically disposed within the first outer tube. Furthermore, in another embodiment, the fork comprising a first outer tube and a second outer tube described above may comprise a pair of first outer tubes disposed respectively within a pair of second outer tubes.

In another embodiment, the bladder of the fork is substantially tubular in form. The bladder may be sealingly retained at one end with a solid surround imposing a squeeze on the bladder end. Additionally, the bladder may be retained at both ends by such squeeze.

In another embodiment, the fork comprises a damping compression ratio falling within a range of 1.8 to 3.2.

In one embodiment the vehicle suspension comprises a damping fluid chamber having a reservoir portion; a compressible chamber; a first gas spring chamber; a second gas spring chamber; a damping piston shaft; a damping valve having a variable flow orifice responsive a movement of the shaft within the damping fluid chamber; and a gas spring valve communicating gas between the first and second gas spring chambers in response to a change of position of the shaft within the damping fluid chamber. The vehicle suspension damper comprises a first damping mechanism and the second damping mechanism utilizes at least one common flow channel. In another embodiment, the pressure within the fillable chamber of the vehicle suspension damper may be externally adjusted. In yet another embodiment, a space within said fillable chamber of the vehicle suspension damper is selected from a group consisting of a vacuum, a gas, and a gas at atmospheric pressure. In another embodiment, a space within said fillable chamber of the vehicle suspension damper comprises a gas at an elevated pressure, the elevated pressure biasing the variable damper towards an open position.

In one embodiment, the at least one damping obstruction of the vehicle suspension damper is configured for selected engagement with the movable valve outer. In another embodiment, the at least one damping obstruction of the vehicle suspension damper is externally adjustable. In another embodiment, the damping obstruction may be a washer.

In one embodiment, the movable barrier of the vehicle suspension damper comprises a piston. In another embodiment, the movable barrier comprises a flexible bladder. In one embodiment, the compressible chamber is preloaded at an elevated pressure. In another embodiment, the content of the compressible chamber is externally adjustable.

In one embodiment, the enclosed fillable space comprises preloaded matter. In another embodiment, the movable barrier comprises a flexible diaphragm. In yet another embodiment, the preloaded matter is a gas. In yet another embodiment, the rebound spring is externally adjustable.

In one embodiment, the second damping mechanism of the vehicle suspension damper is responsive to a pressure compression of the compressible chamber, wherein the pressure results from a selectable input pressure communicated with the compressible chamber. In yet another embodiment, the selectable input pressure is an accumulator. The selectable input pressure may be a pump in one embodiment. In one embodiment, the vehicle suspension damper is coupled with a nested piston arrangement.

Figure 9:
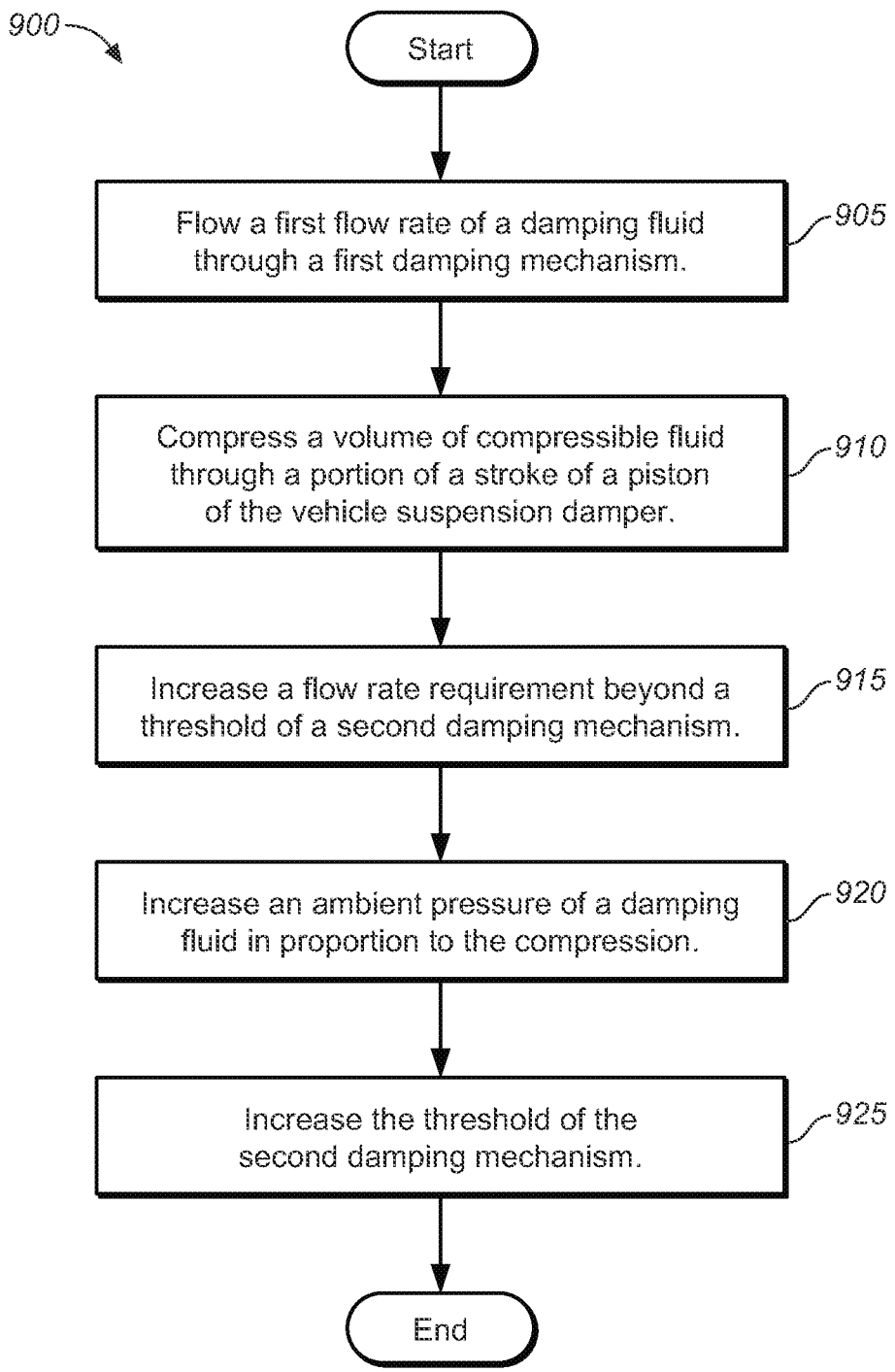
FIG. 9 is a flow chart of an example method for altering a damping rate of a vehicle suspension damper.

Referring to FIG. 9, a flow chart 900 of an example method for altering a damping rate of a vehicle suspension damper 400 in accordance with embodiments of the present technology is shown. In one embodiment and as described herein, method 900 comprises flowing 905 a first flow rate 412 of a damping fluid through a first damping mechanism 402.

Referring now to 910 of FIG. 9 and as described herein, a volume of compressible is compressed through a portion of a stroke of a piston of the vehicle suspension damper 400. Referring to 915 of FIG. 9 and as described herein, a flow rate requirement is increased beyond a threshold of a second damping mechanism 404.

Now referring to 920 of FIG. 9 and as described herein, an ambient pressure of a damping fluid is increased in proportion to the compression of 910. Furthermore, referring to 925 in FIG. 9 and as described herein, the threshold of the second damping mechanism 404 is increased.

Figure 10:
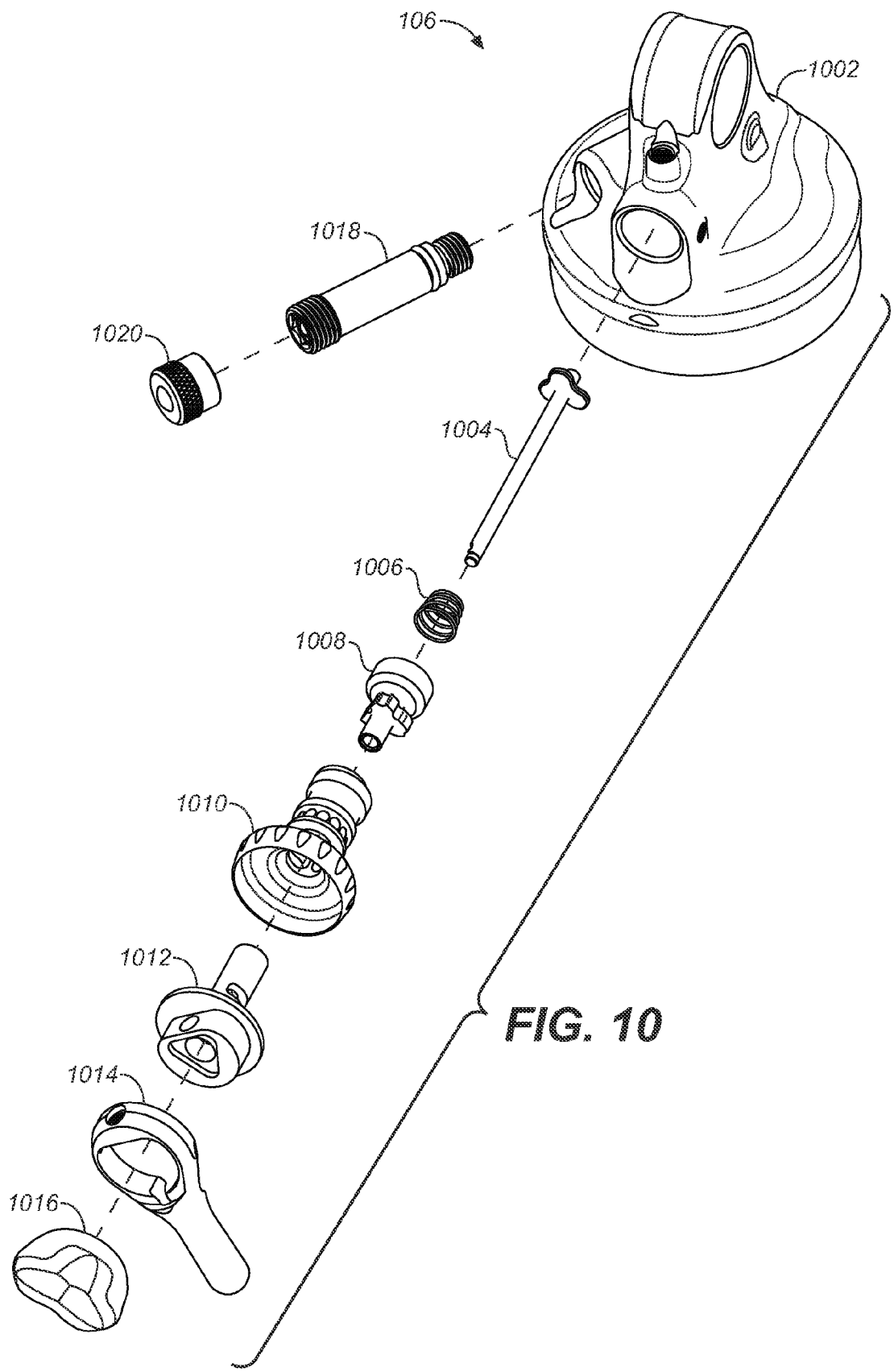
FIG. 10 is a blown-up schematic of an example eyelet assembly embodiment as disclosed herein.

Referring to FIG. 10, a blown-up schematic of an eyelet assembly 106 in accordance with embodiments of the present technology is shown. In one embodiment, eyelet assembly 106 includes, but is not limited to, eyelet 1002, cam shaft with 3 lobes 1004, compression spring 1006, cam in a 3×2 position 1008, rebound or "RD" adjust knob 1010 (in one embodiment adjusts rebound damping independently of compression damping), compression adjust lever boss 1012, lever 1014, compression adjust knob 1016, air valve assembly 1018, and cap air valve 1020.

In one embodiment, eyelet assembly 1000 and the components therein work together to enable the adjustment of internal components of the vehicle suspension damper 400, thereby adjusting mechanically (and independently) either or both of the compression damping and rebound damping rates.

Figure 11A:
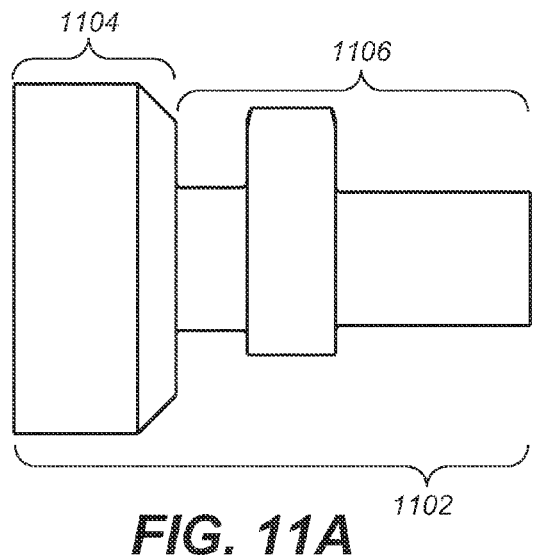
FIG. 11 is a schematic of an example cam embodiment as disclosed herein.
Figure 11B:
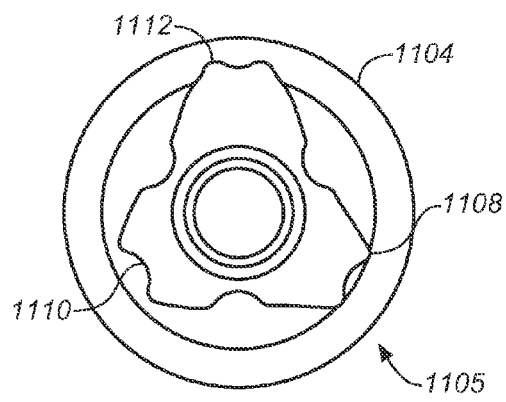
Figure 12A:
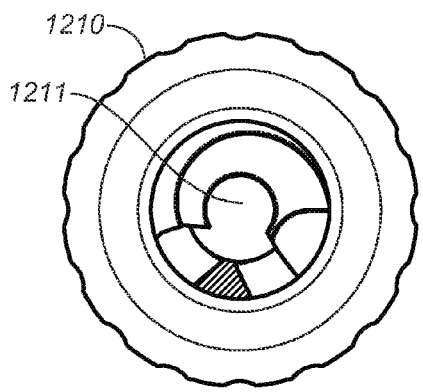
FIG. 12 is a schematic of different views of an example RD adjust knob embodiment as disclosed herein.
Figure 12B:
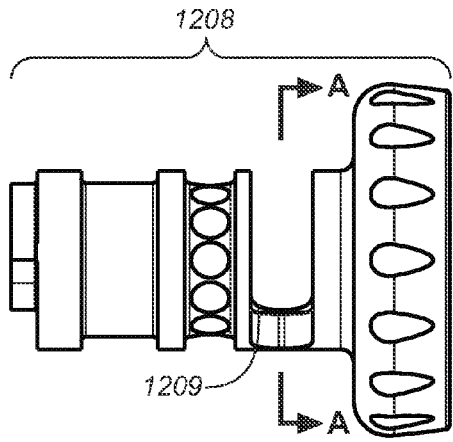
Figure 12C:
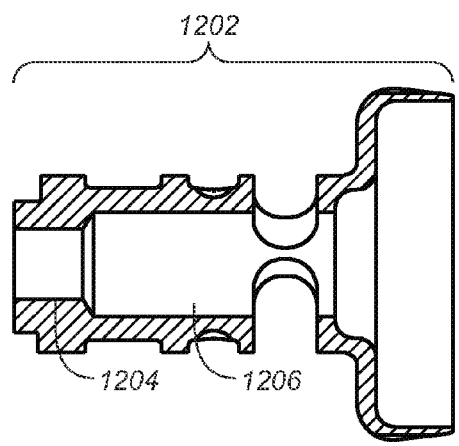
Figure 12D:
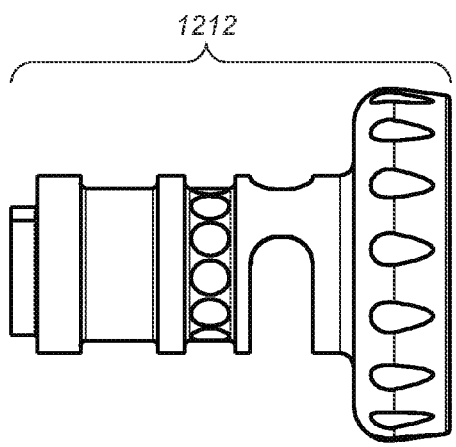

FIG. 11 is a schematic of an example cam 1008 of FIG. 10, in accordance with embodiments of the present technology. FIG. 11 shows side view 1102 of cam 1008 with a first portion 1104 and a second portion 1106. FIG. 11 also shows a frontal view 1105 of first portion 1104. In one embodiment, first portion 1104 includes lobes within. For example frontal view 1105 shows lobes 1108, 1110 and 1112. However, it is understood that more or less lobes may be present in embodiments of the present technology. Rotation of these lobes, resulting from rotation of the corresponding adjuster knobs 806 and cam shafts 1004 causes these lobes 1108, 1110 and 1112, working in tandem with the piston rods 110 and rebound metering rods 112 to cause axial displacement thereof and correspondingly altering spring compression in selected damping valves to adjust damping rates.

Referring now to FIG. 12, a schematic of different views of an example RD adjust knob 1010 in accordance with embodiments of the present technology. For example 1202 of FIG. 12 shows a side view of RD adjust knob 1010 (as seen in FIG. 10) showing components 1204 and 1206 that couple with cam 1008. 1208 of FIG. 12 shows a side view of RD adjust knob 1010 that emphasizes, via the line area A-A, a structural aspect including a gap 1209 configured for receiving another component. Frontal, sectional view 1210 of the line area A-A shows a hole 1211 through the approximate center of RD adjust knob 1010 and the gap's 1209 interaction with that hole 1211. Referring still to FIG. 12, 1212 shows a rotated side view of the RD adjust knob 1010 in a position that is different from side view 1208. Rotation of the adjustment knob 1010 causes rotation of the camshaft 1008 and corresponding axial movement (referring to FIG. 1) of shaft 114. Axial movement of shaft 114 increases or decreases preload on rebound shim valve stack (not numbered) that obstructs rebound damping fluid flow orifices through the piston. When preload is decreased for example, rebound damping fluid flows more freely from above the piston to below the piston during suspension extension and therefore the suspension extends more rapidly.

Figure 13:
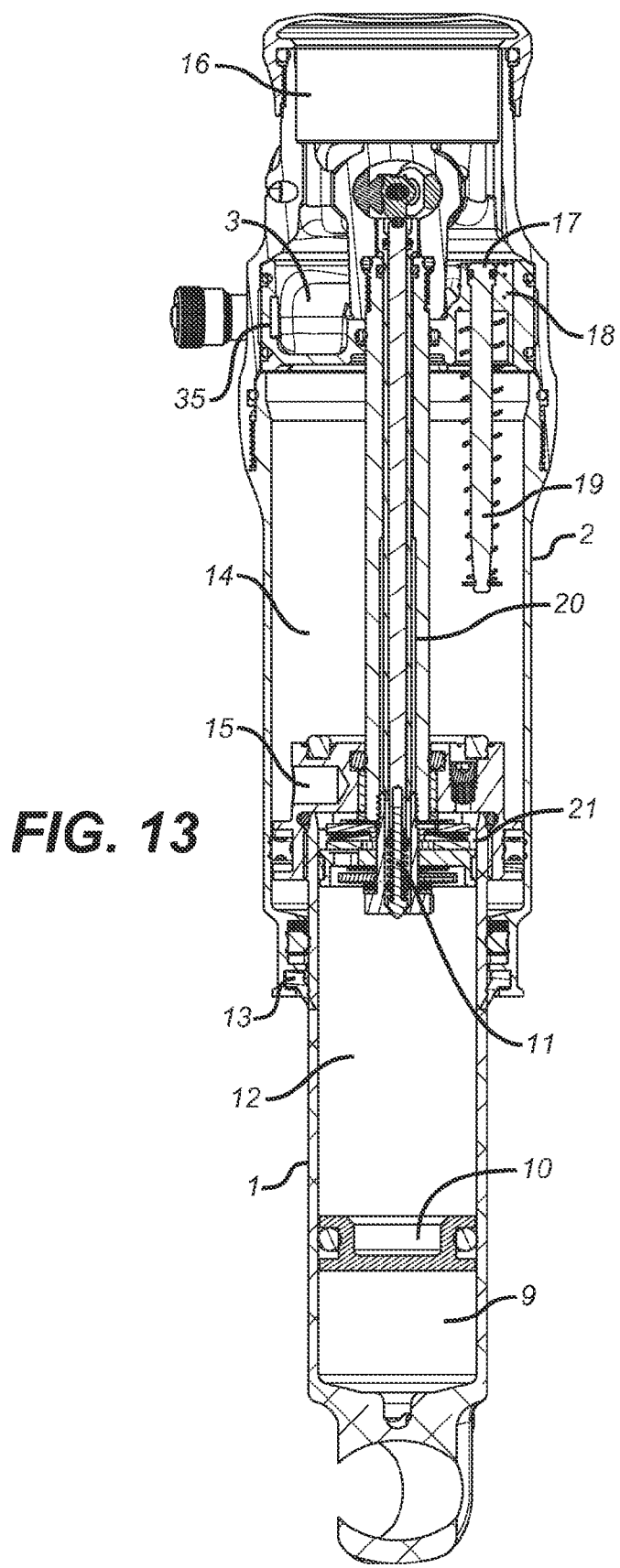
FIG. 13 is a cut away view of a shock absorber embodiment as disclosed herein.

FIG. 13 shows a cut away view of a shock absorber and its corresponding internal parts. In one embodiment the damper body 1 is hollow and contains a floating piston 10 moveably disposed therein. The floating piston 10 divides the interior of the damper body 1 into a compensator gas chamber 9 and a compression damping fluid chamber 12. The compensator gas chamber 9 volume is reduced, by downward movement of the floating piston 10, in proportion to the volume of the damper support shaft 20 that enters the rebound damping fluid chamber 21 as the damper body 1 moves telescopically into the air sleeve 2 during the compression of the shock absorber. As the damper body 1 moves telescopically into the air sleeve 2, pushing the gas compression piston 15 correspondingly further upward in the air sleeve 2, the volume of the primary gas spring chamber 14 is reduced, thereby compressing or further compressing, the gas in the primary gas spring chamber 14.

In one embodiment, the gas pressure in the primary gas spring chamber 14 continues to increase until the top of the gas compression piston 15 impinges upon the lower end of the communication valve shaft 19. At that point the force exerted by the gas compression piston 15 on the lower end of the communication valve shaft 19 moves the communication valve member 17 off of the communication valve seat 18 thereby opening a fluid flow path through the valve assembly 18 and between the primary gas spring chamber 14 and the secondary gas volume chamber 16. Two things (at least) occur as a result of the fluid communication between the primary 14 and secondary 16 gas chambers. Any pressure differential between the primary 14 and secondary 16 chambers equalizes once the flow path 18 between them is opened. Additionally, the effective volume of the shock absorber gas spring is increased by the amount of the secondary chamber 16.

There are several shock absorber parameters that can be varied in order to derive a preferred travel versus. pressure profile, or "spring rate" over the range of travel. Variables that may be selectively altered include: length and diameter of the primary chamber 14, volume of the secondary chamber 16, initial pressure state of the primary chamber 14, initial pressure state of the secondary chamber 16 and length of the communication valve shaft 19.

The initial pressure state and the diameter of the primary 14 chamber define the shape of the travel versus spring pressure profile for the shock absorber prior to opening the communication valve 17. Preferably the values chosen for those variables result in a substantially linear spring rate prior to fluid communication between the primary 14 and secondary chambers 16. In one embodiment, the initial pressure in the secondary chamber 16 is set to equal a pre-calculated pressure in the primary chamber 14 corresponding to a point just before the gas compression piston 15 contacts the lower end of the communication valve shaft 19. When the communication valve 17 is opened with such secondary chamber 16 pressure setting, there is no significant differential pressure between the primary 14 and secondary 16 chambers. Further, there is no significant system pressure drop When the primary 14 and secondary 16 chambers are fluidly communicated. The gas spring volume is increased by the amount of the secondary chamber 16 and the spring rate is correspondingly decreased but the transition from the spring rate associated with only the primary chamber 14 to the spring rate associated with the combined primary 14 and secondary 16 chambers is relatively smooth.

Alternatively the initial pressure in the secondary chamber 16 may be set at the same time as the initial pressure in the primary chamber 14 and at the same pressure. During an initial compression of the shock absorber the volume of the primary chamber 14 is reduced and the pressure in the primary chamber 14 rises until the communication valve 17 is opened. Because the secondary chamber 16 pressure is still at its initial pressure setting fluid flows from the primary chamber 14, through the communication valve 18 into the secondary chamber 16 when the communication valve 17 is opened. The pressure in the now combined primary 14 and secondary 16 chambers equalizes at a pressure value between the pre-communication primary chamber 14 pressure and the initial secondary chamber 16 pressure. During subsequent compression cycles of the shock absorber, the secondary chamber 16 retains the compression pressure of the primary chamber 14 as a set point and no further equalization occurs upon opening the communication valve 17. When the communication valve 17 is opened, there may be a large mass flow rate of gas through the communication valve 17. Such flow may cause the communication valve 17 to open further at high velocities. Uncontrolled opening velocity may damage the communication valve 17 or surrounding parts within the shock absorber. In one embodiment the sealing head of communication valve 17 is large enough to provide a large flow area upon initial cracking open of the communication valve 17. Such larger flow area will result in lower flow velocities and less likelihood of flow driving the valve head and stem to damaging impact. In one embodiment the sealing portion of "head" of the communication valve 17 is at least two times as large in diameter as the shaft of the communication valve 17. In one embodiment the ratio for the sealing head diameter to the shaft diameter is 1.3 to 4.

Figure 14A:
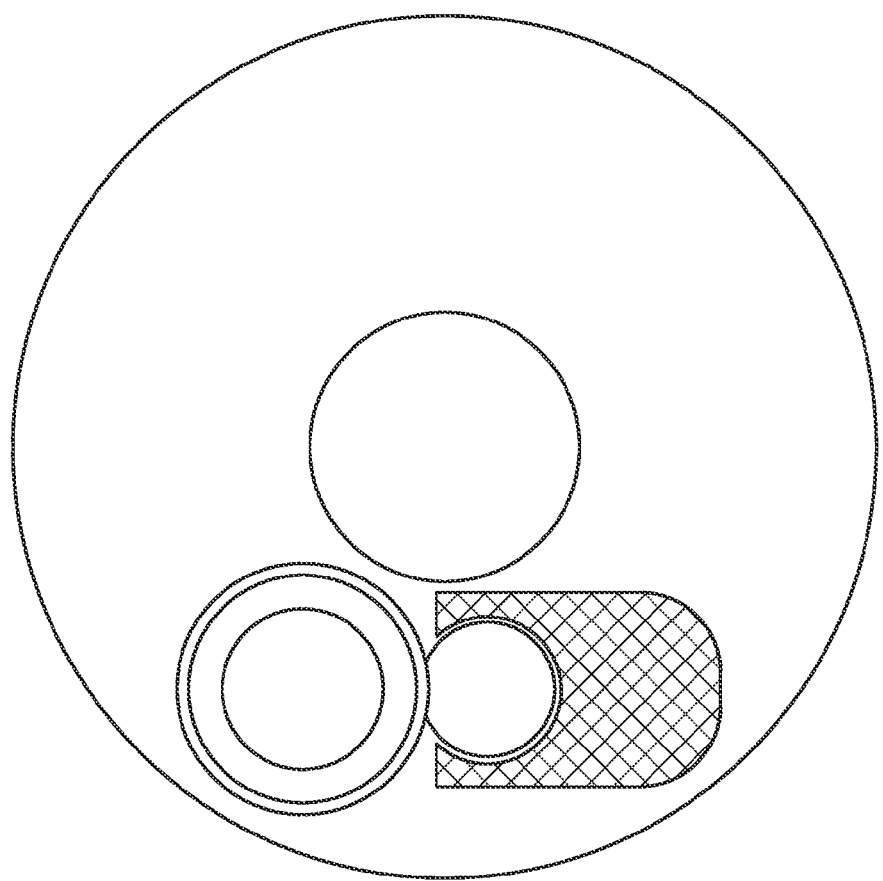
FIG. 14A shows a pressure regulator device having unequal opposing piston areas wherein the piston areas share a common differential datum (e.g. ambient air) as disclosed herein.
Figure 14A:
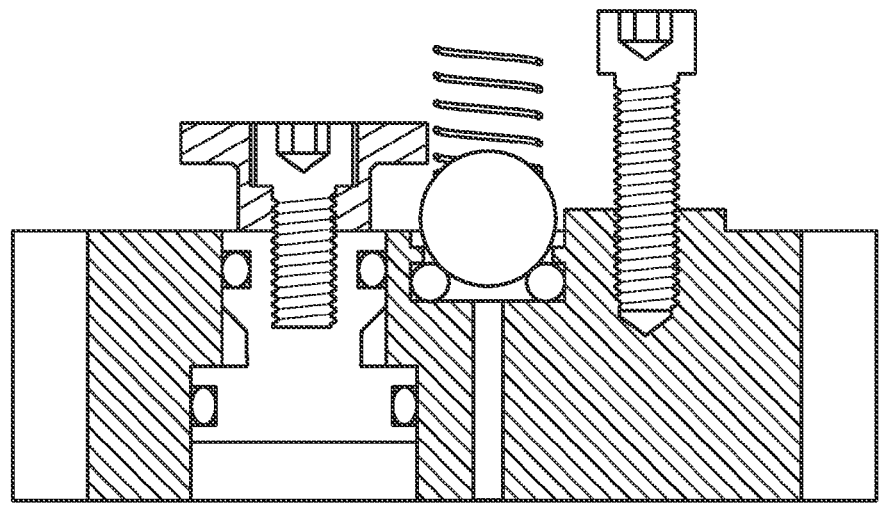
Figure 14B:
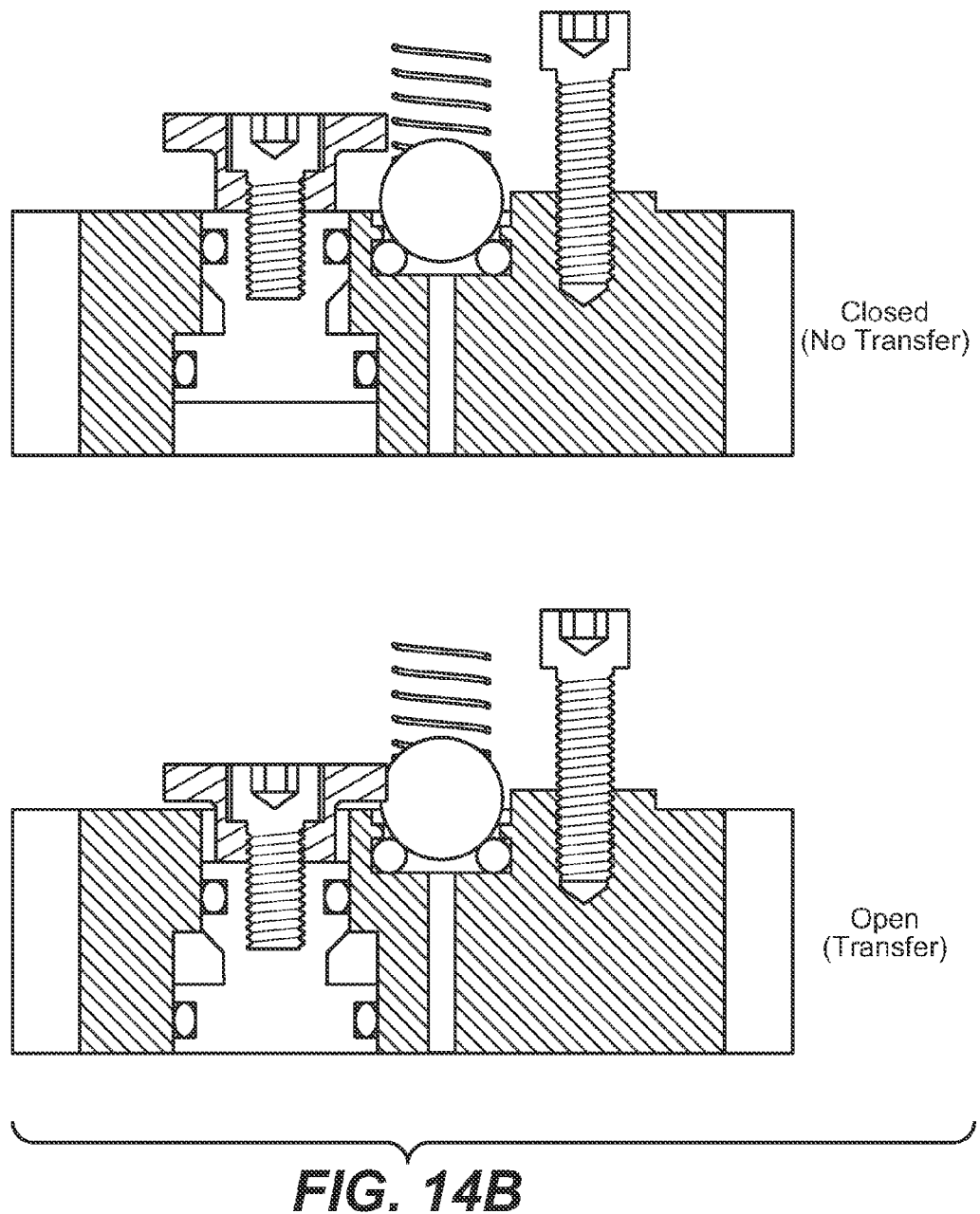
FIG. 14B shows a pressure regulator device having unequal opposing piston areas wherein the piston areas share a common differential datum (e.g. ambient air) as disclosed herein.

In one embodiment a pressure regulator or "pressure divider", as illustrated in FIGS. 14a and 14b, may be used in lieu of, or in combination with, the communication valve 17 to facilitate further selective tailoring of the spring rate curve. Such a pressure divider may be used in parallel or in series with a communication valve 17. The pressure divider may be disposed in the present system to maintain a known differential pressure between the primary and secondary chambers upon opening of the communication valve 17. Optionally the shaft 19 actuated communication valve 17 may be replaced by, or used in parallel with, a spring loaded pressure relief valve (not shown) or other suitable pressure relief valve. Such a pressure relief valve may be set to limit the differential pressure that may build between the primary and secondary chambers during operation. Optionally the pressure divider may be placed downstream of the fill valve 3 in order to regulate pressure in one or both of the primary 14 and secondary chambers 16. Optionally one or more pressure dividers may be used in lieu of the fill valve 3 to regulate the pressure in either or both of the primary 14 and secondary chambers 16 in relation to atmospheric pressure or an additional pressure reservoir. The pressure divider is shown having a 2:1 area ratio. It is noted that any suitable ratio may be used (by providing suitably sized piston areas) in order to facilitate the maintenance of desired differential pressures. It is also noteworthy that, while no vent hole is shown, or absolutely necessary, the "air@atmospheric" volume shown in the FIGS. 14a and 14b represent a volume that may be vented to atmosphere or other suitable ambient pressure (in one embodiment, by a vent hole not shown). In some instances, such as where the pressure divider is included inside the shock absorber between chambers, it may be preferable to leave the "air (atmospheric" volume closed. Minor variances in that volume pressure will have only negligible effect on the operation of the pressure divider.

In one embodiment, as shown in FIG. 13, the communication valve 17 and shaft 19 are not generally coaxial with the shock absorber. That allows the damper support shaft 20 to be occupied by control mechanisms for selectively adjusting and/or blocking valves or orifices of the damper assembly 11 to effect changes in damping rates or lock-out of the damper altogether. Further, such non-coaxial placement of the communication valve 17 and shaft 19 allows separation of the damping fluid (e.g. oil) from the spring fluid (e.g. pressurized gas) thereby reducing the possibility of damping fade (i.e. intermingling of gas and liquid reduces the effectiveness of the liquid as a damping medium) during extended periods of use. As such, shock absorbers of the present type may include isolated gas charge or internal floating piston type damping systems.

It may be desirable to select the point in the travel at which the primary 14 and secondary 16 chambers are communicated. In one embodiment the valve member 17/communication valve shaft 19 is available in different lengths where a longer length is installed for communication earlier in the shock stroke and a shorter length is installed for communication later in the shock stroke. Optionally, the flow splitter module 35 is axially movable within the shock absorber so that the distance between the top of the gas compression piston 15 and the bottom of the communication valve shaft 19 can be selectively varied. The flow splitter 35, and correspondingly the valve 17 and shaft 19, can be positioned closer to the gas compression piston 15 for communication earlier in the shock stroke or further from the gas compression piston 15 for communication later in the shock stroke. In one embodiment (not shown in detail) the flow splitter 35 is axial movable by manipulation of the gas fill valve assembly 3 upwardly or downwardly in a lengthwise (axial relative to the shock) slot opened in a wall of the tank 6. A suitable retainer plate partially covering the slot is used to retain the gas fill valve assembly 3 and correspondingly the flow splitter module 35 in the selected axial position relative to the tank 6 and correspondingly relative to the top of the gas compression piston 15.

Figure 15:
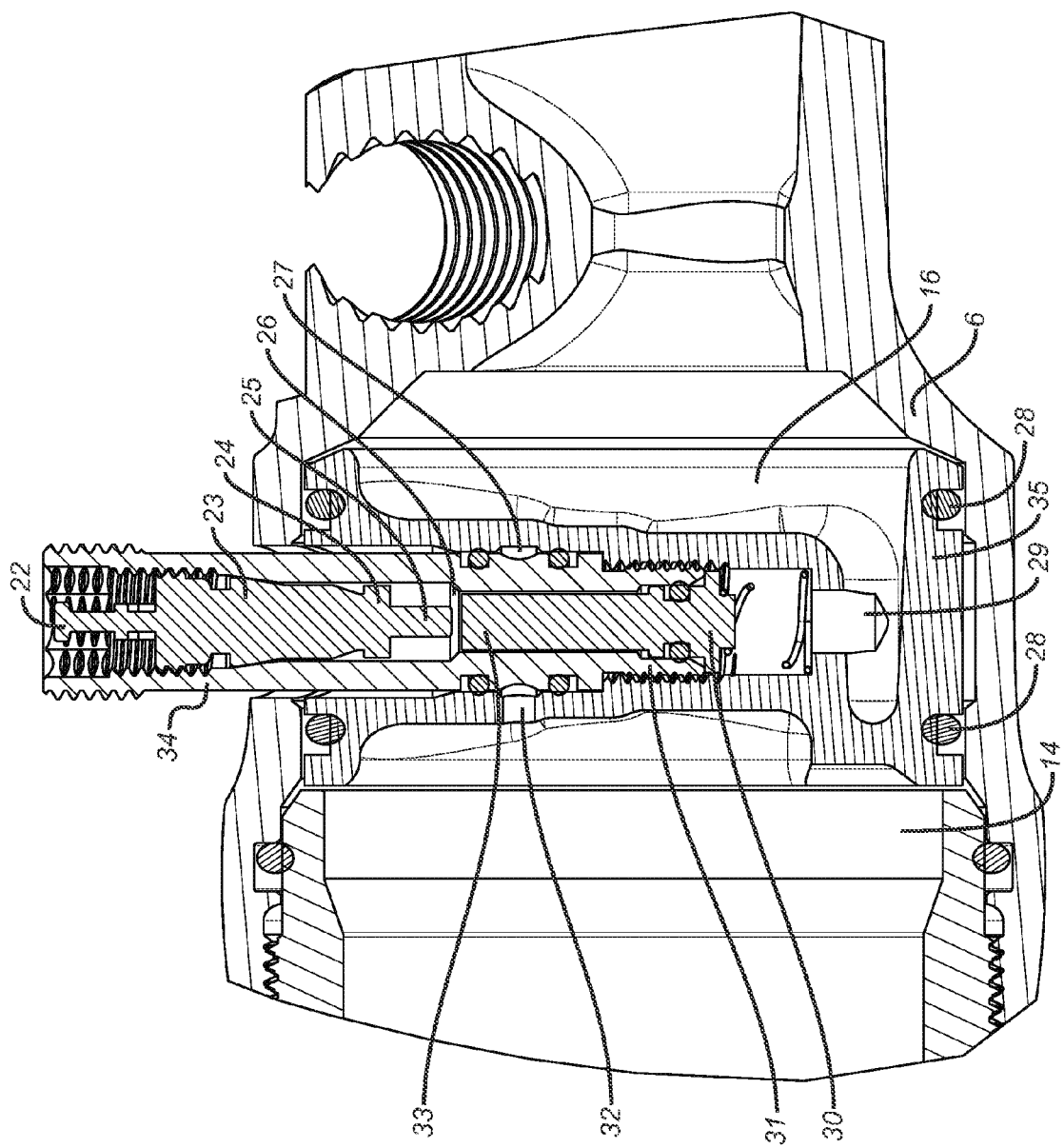
FIG. 15 is a cut away view of an upper tank portion of a shock absorber embodiment and shows the details of a fill valve assembly as disclosed herein.

In one embodiment the primary 14 and secondary 16 chambers are filled by introducing pressure, from a suitable gas pump or other source of pressurized gas, into the gas fill valve 3. In one embodiment the gas fill valve 3 comprises a Schrader type valve. Alternatively, the gas fill valve may comprise any other suitable fill valve mechanism. A Schrader type gas fill valve assembly 3 is shown in FIG. 15. The fill valve body 34 is installed in the flow splitter module 35, which in turn is installed in the shock absorber tank 6; generally between the primary 14 and secondary 16 chambers so that gas introduced into the valve 3 can readily and selectively be distributed to one or both of the primary 14 and secondary 16 chambers.

Referring to FIG. 15, the primary fill valve core 23 may be a Schrader type valve core. In such an embodiment, the valve stem 22 is axially fixed relative to, or abutted to, the primary fill valve 24 and corresponding valve pusher stem 25. The secondary chamber fill valve stem 33 is axially adjacent the valve pusher stem 25. The secondary chamber fill valve 30 is located at or proximate an end of the secondary chamber fill valve stem 33.

Figure 16:
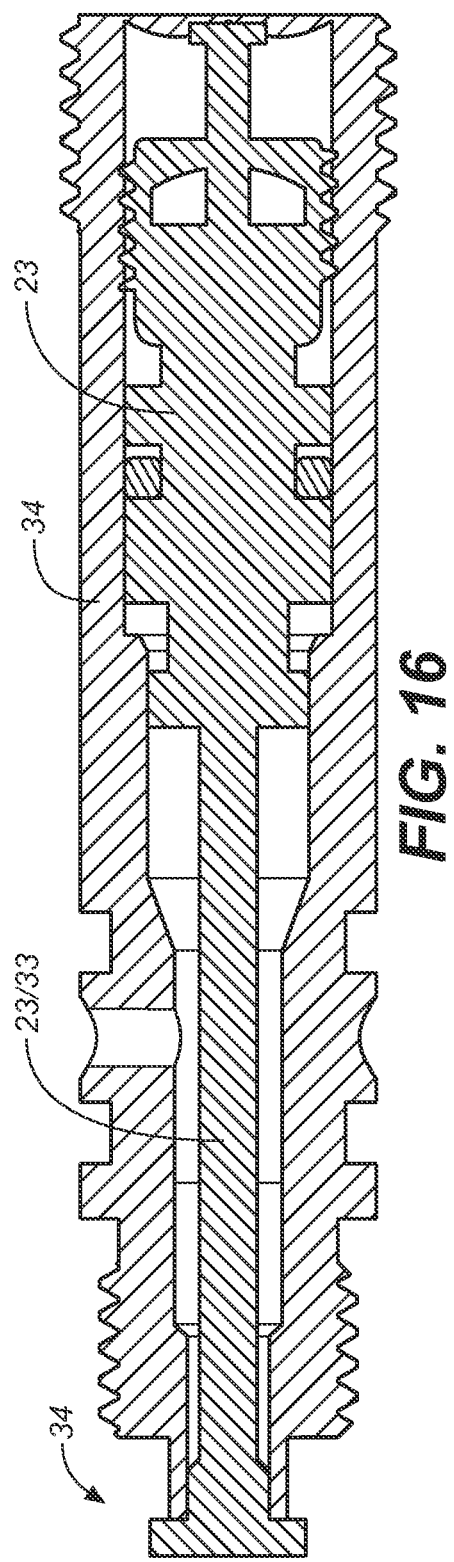
FIG. 16 shows a modular fill valve assembly embodiment as disclosed herein.

FIG. 16 shows a Schrader type fill valve module. The Schrader type module has fewer components than the modified Schrader valve (e.g. than FIG. 15). Tolerances are therefore less critical and part costs are thereby reduced. The module includes a fill valve body 34. The primary valve core 23, pusher stem/secondary chamber fill valve stem 25|33 and secondary chamber fill valve 30 are integrated into a single unit disposed within the fill valve body 34. The integrated unit functions much as the separate piece assembly (described below) functions with an exception being that there is no gap 26. There are fewer parts and fewer critical manufacturing tolerances for the integrated unit.

Referring to FIG. 15, the fill valve 3 is designed to fill both of the primary 14 and secondary 16 chambers with pressurized gas from the single valve body 34. In one aspect the valve stem 22 is connected, through the valve core 23 to the primary fill valve 24 such that axial movement of the valve stem 22 causes axial movement of the primary fill valve 24 and valve pusher stem 25. Sufficient axial movement of the valve pusher stem 25 closes the gap 26 until the valve pusher stem 25 contacts the secondary chamber fill valve stem 33. Following such closure of the gap 26, further movement of the valve pusher stem 25 moves the secondary chamber fill valve stem 33 and correspondingly separates the secondary chamber fill valve 30 from the secondary chamber fill valve seat 31. The result is that sufficient axial movement of the valve stem 22 opens the primary fill Valve 24 and further movement of the valve stem 22 subsequently opens the secondary chamber fill valve 30.

The valve stem 22 may be moved either mechanically, by a probe on a pressure fitting of a pressurized gas source, or solely by the introduction of pressurized gas into the fill valve body 34 wherein the pressurized gas acts over the surface area (i.e. piston area) of the primary fill valve 24. In one embodiment, the dimension of the gap 26 is set such that movement of the valve stem 22 and primary fill valve 24, caused solely by the introduction of pressure, is not sufficient under normal operating pressures to close the gap 26 between the valve pusher stem 25 and the secondary chamber fill valve stem 33. Correspondingly, only the primary fill valve is opened and pressurized gas is only introduced through the annulus 27 and primary passage 32 into the primary chamber 14.

Optionally, a mechanical probe, attached to a pressure hose fitting for example, is used to move the valve stem 22. The length of the probe is sufficient to open the primary fill valve 24, close the gap 26, cause movement of the valve pusher stem 25 and secondary chamber fill valve stem 33 and thereby open the secondary chamber fill valve 30. Correspondingly, pressurized gas flows into the primary chamber as previously described and also through the open secondary chamber fill valve 30, through the secondary passage 29 and into the secondary chamber 16.

The fill valve and shock absorber shown in the Figures herein include o-ring seals as shown and where appropriate. Any suitable seals may be used and seals may be used where not shown or omitted even though shown in any case as appropriate for the channelling and retention of pressurized fluids.

While the foregoing is directed to embodiments of the present invention, other and further embodiments of the invention may be implemented without departing from the scope of the invention, and the scope thereof is determined by the claims that follow.

What we claim is:

1. A vehicle suspension damper for providing a variable damping rate, said vehicle suspension damper comprising:
   a first damping mechanism having a variable first threshold pressure, wherein said first damping mechanism comprises:
     a damping adjustment valve comprising a first surface and a second surface, said first surface abutting a first fluid chamber, wherein said first fluid chamber comprises a damping fluid chamber; and
     a damping adjustment spring abutting said second surface, a force exerted by said damping adjustment spring being selectively adjustable and providing variable resistance to pressure from a damping fluid of said first fluid chamber on said damping adjustment valve,
   wherein said damping adjustment valve is configured for, when said variable first threshold pressure is overcome, opening and allowing a first portion of said damping fluid to flow, along a first flow path, between said first fluid chamber and a second fluid chamber that is separate from said first fluid chamber;

a second damping mechanism having a second threshold pressure and configured for, when said second threshold pressure is overcome, opening and allowing a second portion of said damping fluid to flow, along a second flow path, between said first fluid chamber and said second fluid chamber, wherein said first flow path is in parallel with said second flow path;

a compressible chamber in pressure communication with said first fluid chamber, wherein said second damping mechanism is responsive to a compression of said compressible chamber, wherein said second damping mechanism comprises:

a variable damper enclosing a fillable chamber, said variable damper comprising:
  a valve inner; and
  a movable valve outer, said movable valve outer engaging portions of said valve inner, said movable valve outer configured for selectively obstructing said second flow path running between a first portion of said damping fluid chamber and a second portion of said damping fluid chamber in response to a state of said compression of said compressible chamber, wherein said fillable chamber creates a gap between said valve inner and said movable valve outer; and a shaft configured for, upon compression of said vehicle suspension damper, moving toward said compressible chamber, and wherein as said shaft moves further into said first fluid chamber during a compression stroke of said vehicle suspension damper, a differential pressure between said damping fluid and said fillable chamber drives said movable valve outer and said valve inner more tightly together axially, thereby causing said gap to become partially closed, wherein as said gap becomes said partially closed, said movable valve outer increases a closure force against said second flow path, such that as said shaft moves further into said first fluid chamber, said increasing closure force applied against said second flow path by said movable valve outer creates an increasing difficulty for said vehicle suspension damper to compress.

2. The vehicle suspension damper of claim 1, being of such an arrangement that, in use, upon said compression of said vehicle suspension damper, said shaft enters said damping fluid chamber causing an available fluid volume within said damping fluid chamber to be displaced and reduced, whereby a combination of an incursion of said shaft and said damping fluid remaining in said damping fluid chamber compresses said compressible chamber and thereby increases the volume of said damping fluid chamber, a pressure and volume of said compressible chamber being in a compressed or further compressed state such that a static pressure of said damping fluid is increased functionally with change of a position in a compression stroke of said vehicle suspension damper.

3. The vehicle suspension damper of claim 1, further comprising:
a movable barrier assembly separating a fluid of said compressible chamber and a fluid of said damping fluid chamber, said movable barrier transferring pressure between said damping fluid chamber to said compressible chamber.

4. The vehicle suspension damper of claim 1, wherein a seating force of said damping adjustment valve may be adjusted by manipulation of an exterior portion of said vehicle suspension damper.

5. The vehicle suspension damper of claim 1, wherein said fillable chamber comprises a variable damper spring having a first end and a second end, said first end restrained by said valve inner, said second end restrained by said movable valve outer, said variable damper spring configured for providing resistance to said variable damper that is obstructing said second flow path in response to said compression of said compressible chamber, said variable damper spring biasing said variable damper towards an open position.

6. The vehicle suspension damper of claim 1, further comprising:
at least one damping obstruction coupled with said valve inner, said at least one damping obstruction configured to receive an outer portion of said movable valve outer when said movable valve outer moves in response to said state of said compression of said compressible chamber, said at least one damping obstruction biasing said movable valve outer towards a closed position.

7. The vehicle suspension damper of claim 1, wherein said vehicle suspension damper is positioned in a first leg of a fork of a vehicle.

8. The vehicle suspension damper of claim 7, wherein a rebound spring is positioned in a second leg of said fork, said rebound spring configured for inducing a rebound of said fork by storing energy during compression of said fork and then releasing said energy when a disparity is passed.

9. The vehicle suspension damper of claim 7, further comprising:
a flexible bladder positioned within a reservoir, wherein said compressible fluid chamber is at an initial pressure, said reservoir is in pressure communication with said compressible fluid chamber, and said flexible bladder is deflecting proportionally to an amount of fluid flowing between said damping fluid chamber and said reservoir.

10. The vehicle suspension damper of claim 7, wherein said second damping mechanism is coupled with a piston assembly.

11. A method for altering a damping rate of a vehicle suspension damper, said method comprising:
flowing, through a first flow path, a first portion of a damping fluid at a first flow rate through a first damping mechanism, wherein said first damping mechanism comprises a damping adjustment spring;

compressing a volume of compressible fluid through a portion of a stroke of a piston of said vehicle suspension damper, wherein upon said compressing, a shaft enters a damping fluid chamber causing an available fluid volume within said damping fluid chamber to be displaced and reduced, whereby a combination of an incursion of said shaft and said damping fluid remaining in said damping fluid chamber compresses a compressible chamber and thereby increases a volume of said damping fluid chamber;

increasing a flow rate requirement beyond a threshold of said first damping mechanism, such that a flow rate of a flow of said damping fluid against said first damping mechanism is sufficient to pressure said first damping mechanism to open and allow said first portion of said damping fluid to flow there through along said first flow path;

increasing an ambient pressure of said damping fluid in proportion to said compression; and increasing a threshold of a second damping mechanism, wherein when said threshold of said second damping mechanism is achieved, said second damping mechanism opens to allow a second portion of said damping fluid of said damping fluid chamber to flow there through along a second flow path running between a first portion of said damping fluid chamber and a second portion of said damping fluid chamber, wherein said first flow path is in parallel with said second flow path, wherein said increasing said flow rate requirements beyond said threshold of said second damping mechanism comprises:

selectively obstructing said second flow path in response to a stage of said compression of said compressible chamber, wherein said damping fluid chamber is positioned on a first side of a piston assembly, and said selectively obstructing is performed by a variable damper enclosing a fillable chamber, wherein said variable damper comprises:
a valve inner; and
a movable valve outer, said movable valve outer engaging portions of said valve inner, said movable valve outer configured for said selectively obstructing said second flow path, wherein said fillable chamber creates a gap between said valve inner and said movable valve outer, and wherein as said shaft moves further into said first fluid chamber during a compression stroke of said vehicle suspension damper, a differential pressure between said damping fluid and said fillable chamber drives said movable valve outer and said valve inner more tightly together axially, thereby causing said gap to become partially closed, wherein as said gap becomes said partially closed, said movable valve outer increases a closure force against said second flow path, such that as said shaft moves further into said first fluid chamber, said increasing closure force applied against said second flow path by said movable valve outer creates an increasing difficulty for said vehicle suspension damper to compress.

12. The method of claim 11, further comprising:
providing a resistance to said variable damper obstructing said second flow path in response to said compression of said compressible chamber via a variable damper spring positioned within said fillable chamber.

13. A valve piston assembly for providing a variable damping rate, said valve piston assembly comprising:
a first damping mechanism having a selectively adjustable variable first threshold pressure, wherein when said selectively adjustable variable first threshold pressure is overcome, a portion of said first damping mechanism opens and allows a first portion of a damping fluid to flow, along a first flow path, between a first fluid chamber and a second fluid chamber;
a second damping mechanism having a second and variable threshold pressure, wherein when said second and variable threshold pressure is overcome, said second damping mechanism opens and allows a second portion of said damping fluid to flow, along a second flow path, between said first fluid chamber and said second fluid chamber, wherein said first flow path is in parallel with said second flow path; and
a compressible chamber in communication with a damping fluid chamber, wherein said first fluid chamber comprises said damping fluid chamber and said second fluid chamber is separate from said first fluid chamber, wherein said second damping mechanism causes a valve damping rate to vary in response to a compression of said compressible chamber, and
wherein said second damping mechanism comprises:
a variable damper enclosing a fillable chamber, said variable damper comprising:
a valve inner; and
a movable valve outer, said movable valve outer engaging portions of said valve inner, said movable valve outer configured for selectively obstructing said second flow path running between a first portion of said damping fluid chamber and a second portion of said damping fluid chamber in response to a state of said compression of said compressible chamber, wherein said fillable chamber creates a gap between said valve inner and said movable valve outer; and
a shaft configured for, upon compression of said vehicle suspension damper, moving toward said compressible chamber,
wherein as said shaft moves further into said first fluid chamber during a compression stroke of said vehicle suspension damper, a differential pressure between said damping fluid and said fillable chamber drives said movable valve outer and said valve inner more tightly together axially, thereby causing said gap to become partially closed, wherein as said gap becomes said partially closed, said movable valve outer increases a closure force against said second flow path, such that as said shaft moves further into said first fluid chamber, said increasing closure force applied against said second flow path by said movable valve outer creates an increasing difficulty for said vehicle suspension damper to compress.

14. The valve piston assembly of claim 13, wherein said first damping mechanism comprises:
a damping adjustment valve comprising a first surface and a second surface, said first surface abutting said damping fluid chamber; and
a damping adjustment spring abutting said second surface, said damping adjustment spring configured for providing variable resistance to pressure from said damping fluid of said damping fluid chamber on said damping adjustment valve,
wherein said damping adjustment valve is configured for opening and allowing said first portion of said damping fluid to flow between said first fluid chamber and said second fluid chamber that is positioned on a second side of a piston assembly when said selectively variable first threshold pressure is overcome, wherein said damping fluid chamber is positioned on a first side of said piston assembly.

15. The valve piston assembly of claim 14, wherein a seating force of said damping adjustment valve may be externally adjusted.

* * * * *